United States Patent
Newton et al.

(10) Patent No.: US 6,356,045 B1
(45) Date of Patent: Mar. 12, 2002

(54) OPERATING KNOB DEVICE AND ELECTRONIC EQUIPMENT INCLUDING THE SAME

(75) Inventors: Scott Michael Newton, Saint James; James Richard Overocker, Seldon; Saul Adam Walker, Coram; David Rayna, Malverne, all of NY (US)

(73) Assignee: Otari Inc. (JP)

( * ) Notice: Subject to any disclaimer, the term of this patent is extended or adjusted under 35 U.S.C. 154(b) by 58 days.

(21) Appl. No.: 09/617,889

(22) Filed: Jul. 17, 2000

(51) Int. Cl.[7] .............................................. G05B 13/00
(52) U.S. Cl. ...................... 318/561; 318/566; 318/569; 318/687
(58) Field of Search ................................ 318/560, 561, 318/563, 566, 568.1, 569, 578, 579, 600–608, 615–618, 652, 687

(56) References Cited

U.S. PATENT DOCUMENTS

| | | | |
|---|---|---|---|
| 4,402,246 A | | 9/1983 | Sekiguchi |
| 4,511,824 A | | 4/1985 | Goddard |
| 4,631,525 A | | 12/1986 | Serravalle, Jr. |
| 5,128,661 A | | 7/1992 | Fowler |
| 5,220,260 A | * | 6/1993 | Schuler ..................... 318/561 |
| 5,239,458 A | | 8/1993 | Suzuki |
| 5,243,513 A | | 9/1993 | Peters |
| 5,381,080 A | * | 1/1995 | Schnell et al. ............... 318/566 |
| 5,959,610 A | | 9/1999 | Silfvast |

* cited by examiner

Primary Examiner—Khanh Dang
(74) Attorney, Agent, or Firm—Baker Botts LLP

(57) ABSTRACT

An operating knob device has: a position detection portion for detecting a position of a set numerical value of an object to be set; an operating portion for changing and operating the set numerical value; a drive portion for driving the operating portion; and a control portion for controlling the drive portion on the basis of a detection result of the position detection portion. The control portion includes: a first position calculation portion for calculating a first set numerical value that is a current set numerical value of the object to be set, on the basis of the detection result of the position detection portion; a second position calculation portion for calculating one or a plurality of second set numerical values that are set numerical values before change of the object to be set, on the basis of the detection result of the position detection portion; and a drive control portion for controlling the drive portion to be driven and changing and controlling a drive parameter of the drive portion when an absolute value of a difference between the first set numerical value and at least one of second set numerical values falls within an allowable range. Thus, the operator may reset the position of the operating portion only in accordance with a finger feel without visually confirming the position.

34 Claims, 23 Drawing Sheets

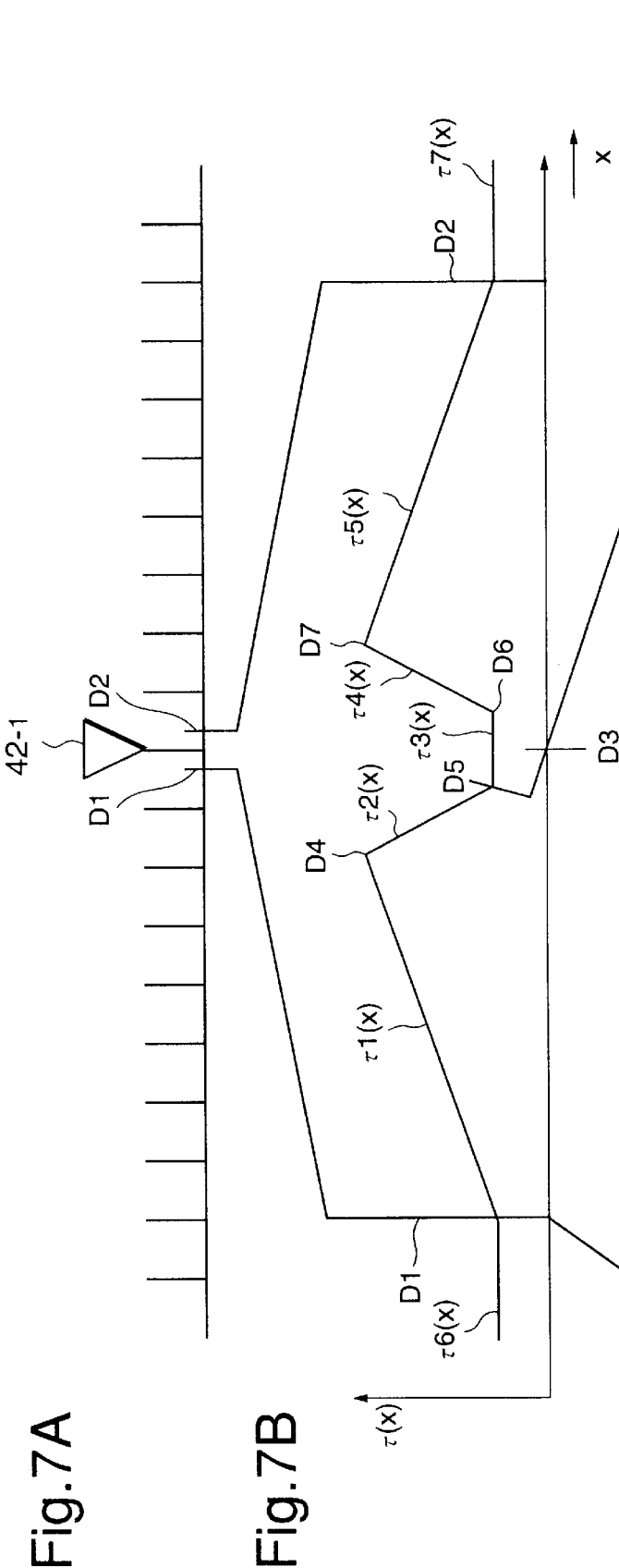

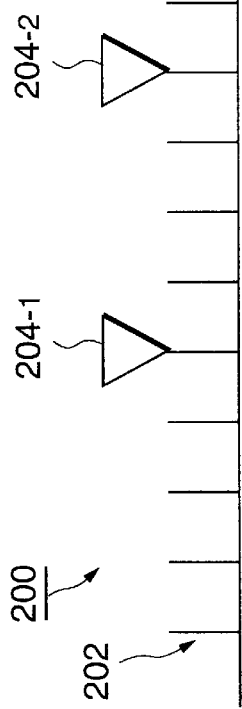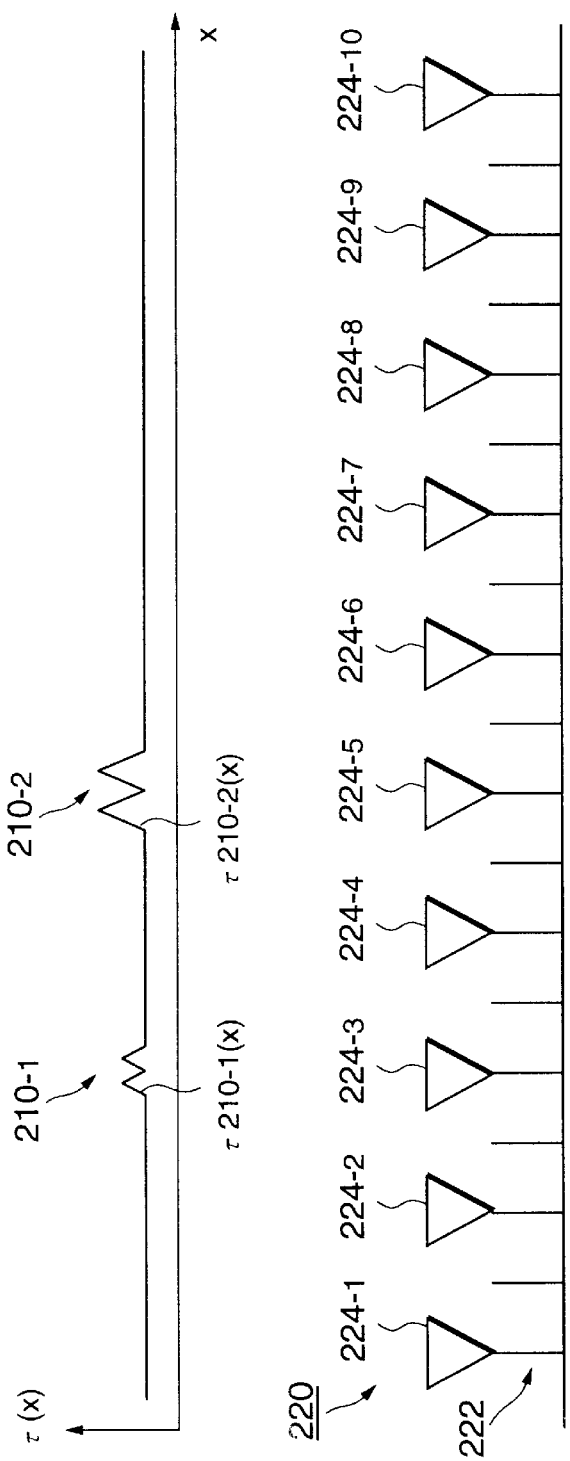

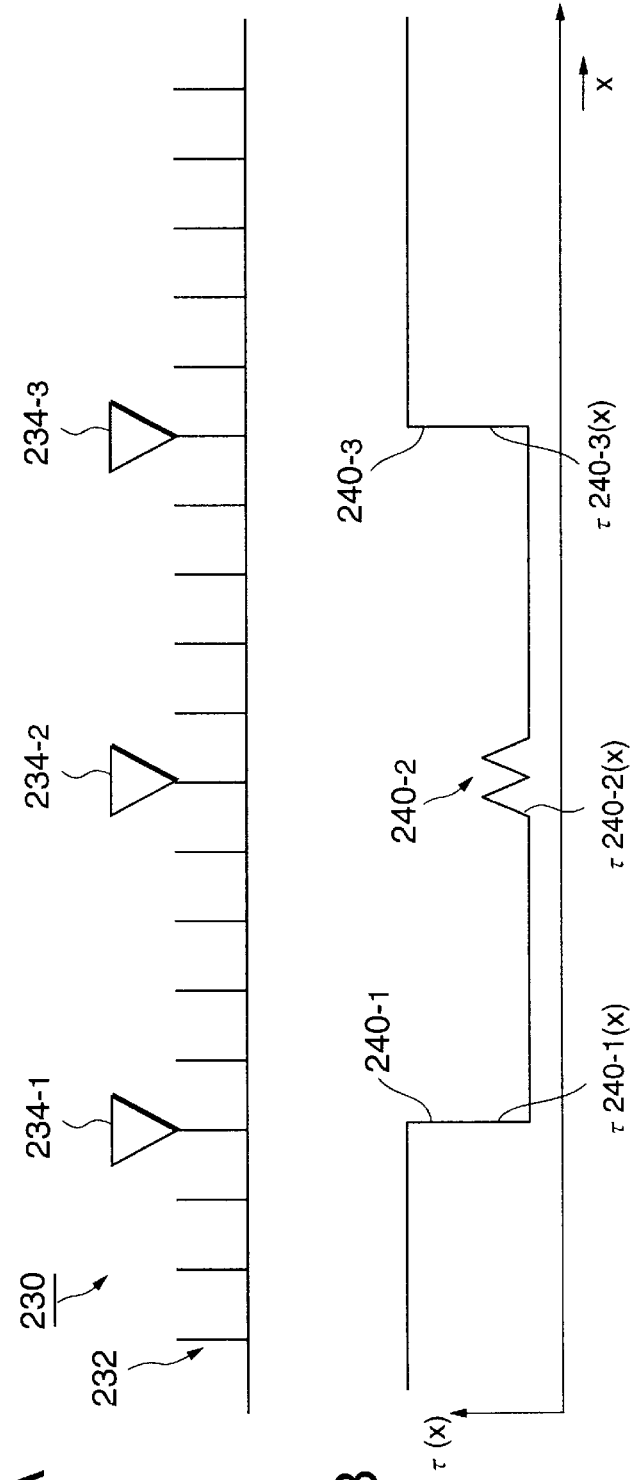

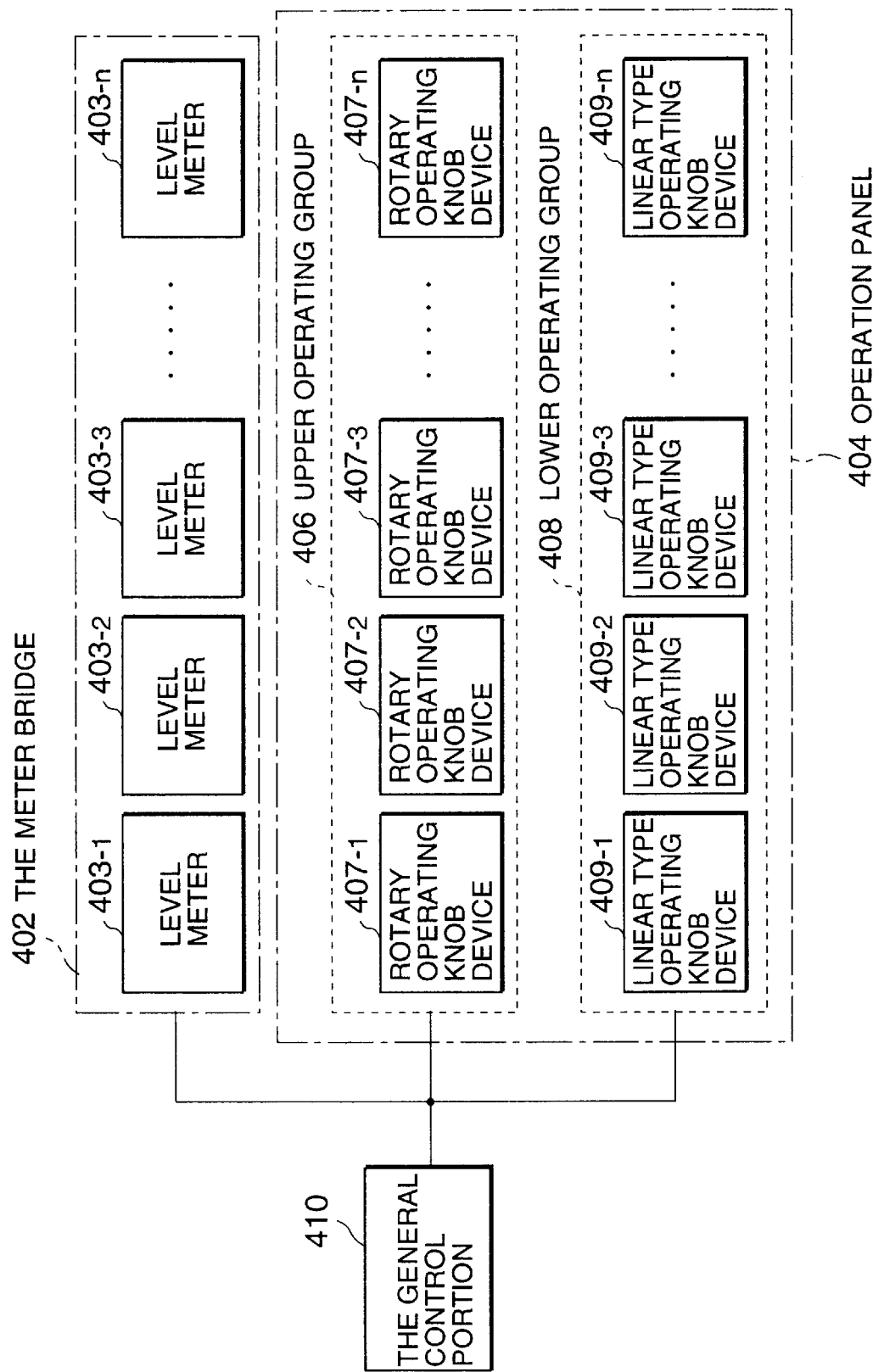

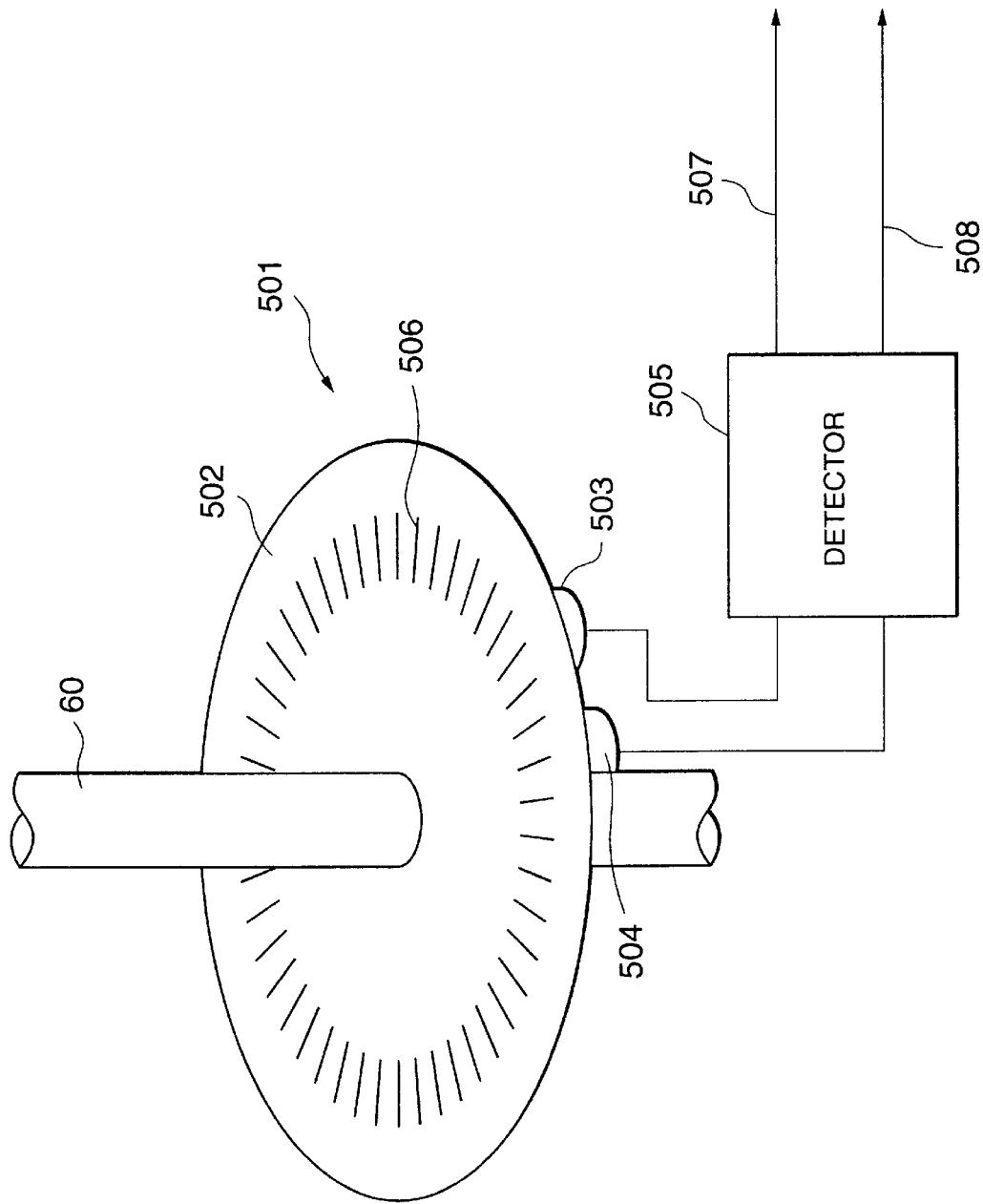

OPERATING KNOB DEVICE AND ELECTRONIC EQUIPMENT INCLUDING THE SAME

BACKGROUND OF THE INVENTION

1. Field of the Invention

The present invention relates to an operating knob device and electronic equipment including the same.

2. Description of the Related Art

An operating knob device is known as a device for adjusting an amount of sound of electronic equipment such as acoustic equipment or communication equipment. A typical knob device is composed of a variable resistor provided with a rotary shaft and an operating portion such as an operating knob mounted on a rotary shaft. The operating knob is operated to thereby change a resistance value of the variable resistor. Thus, it is possible to change a set value of the variable resistor.

On the other hand, an operating knob device that may cope with the automation is also known. This operating knob device has an electrical motor to the rotary shaft of the variable resistor. In this operating knob device, the set value of the variable resistor may be changed by the operating knob and the electrical motor. Namely, in this operating knob device, the electrical motor is operated as desired, thereby changing the set value of the valuable resistor. Thus, the resistance value of the variable resistor is changed in response to the rotation of the operation knob.

Here, in such an operating knob device, it is important to facilitate the setup of the position of the operating knob. In particular, in some cases, in the operating knob device, it is necessary to return the operating knob back to the original position after the operating knob has been once operated. This operation to return the operating knob back to the original position of the operation knob is referred to as reset.

In order to facilitate this reset, (1) the original position of the variable resistor is stored in a memory within a computer, and when the variable resistor is returned back to the original position, the variable resistor is returned back to the original position by the motor mounted on the variable resistor.

(2) It is considered to provide a structure where a number of light emitting diodes are arranged in the vicinity of the operating knob and a point representative of the original position is lit.

However, in the case using the motor (1), the speed for returning to the original position depends upon an rpm of the motor.

It is impossible to return the variable resistor taking a time slowly or return quickly for a short period of time in accordance with the operator's intention. Also, in a method for indicating the return position by the light emitting diodes, it is necessary for the operator to follow the return position through his eyes. For this reason, if the operator is not accustomed with the operation, it takes a long time to return.

SUMMARY OF THE INVENTION

In order to solve the above-mentioned defects, an object of the present invention is to provide an operating knob device and electronic equipment including the same, which may prevent the follow of the operator's eyes to the reset operation while making it possible to perform the operation in accordance with his intention when the operator resets an object to be operated to a certain set value.

According to the present invention, there is provided an operating knob device having: a position detection portion for detecting a position of a set numerical value of an object to be set; an operating portion for changing and operating the set numerical value; a drive portion for driving the operating portion; and a control portion for controlling the drive portion on the basis of a detection result of the position detection portion. The control portion includes: a first position calculation portion for calculating a first set numerical value that is a current set numerical value of the object to be set, on the basis of the detection result of the position detection portion; a second position calculation portion for calculating one or a plurality of second set numerical values that are set numerical values before change of the object to be set, on the basis of the detection result of the position detection portion; and a drive control portion for controlling the drive portion to be driven and changing and controlling a drive parameter of the drive portion when an absolute value of a difference between the first set numerical value and at least one second set numerical value falls within an allowable range.

According to the present invention, by operating the operating portion, the current first set numerical value approaches the target second set numerical value. Then, when the difference between the first set numerical value and the second set numerical value falls within a certain allowable range, the drive portion is driven so that the operating portion reaches the target second set numerical value in an automatic manner. Thus, it is possible for the operator to move the operating portion to the position of the target second set numerical value without visually observing the target second set numerical value.

It is preferable that the drive control portion changes and controls a torque of the drive portion. Thus, it is possible to change and control the value of the torque as desired and it is possible to slowly return the operating portion back to the original position while taking a time or quickly return it for a short period of time in accordance with the operator's intention, thereby enhancing the operationability.

Also, according to the present invention, it is preferable that the drive control portion is controlled to simulate a mechanical detent. Thus, it is possible for the operator to reset the operating portion back to the original position only in accordance with the finger sense without eye follow of the reset position, thereby enhancing the operationability. Furthermore, it is possible to provide a sense such as a mechanical detent at any desired position.

It is also preferable that the drive control portion is controlled to simulate a mechanical stop. Thus, it is possible for the operator to readily clearly recognize the position where the operating portion should stop when the operating portion is reset only in accordance with the finger sense of the operator.

Also, according to the present invention, it is preferable that the drive control portion is controlled to simulate a mechanical detent in the case where at least one of second set numerical values is selected out of the plurality of second set numerical values, and to simulate a mechanical stop in the case where the other second set numerical value is selected. It is thus possible for the operator to distinguish the plurality of positions to be reset according to, for example, the importance only in accordance with the finger sense in the operation of the operating portion to thereby further enhance the operationability.

Also, according to the present invention, it is preferable that the drive control portion is controlled to change at least one of second set numerical values to any desired value. Thus, since the reset position is set freely, the operator does not have to pay his attention to the setup operation.

Also, it is preferable that the drive control portion is controlled so that the plurality of second set numerical values is present in a variable range. It is thus possible for the operator to distinguish the position within the variable range and the plurality of second set numerical values (plural reset positions) from each other without visual observation and to recognize that by the operation of the operating portion.

Also, according to the present invention, there is provided a detection portion for detecting whether or not an operator contacts with the operating portion. It is preferable that the drive control portion is controlled to drive the drive portion when the detection portion detects the contact condition. Thus, since the drive portion is driven only in the contact condition, it is unnecessary to drive the drive portion in the noncontact condition (i.e., when the operator does not operate the operating portion), and it is possible to aim the reduction of the energy consumption and the wear of the drive portion.

According to the present invention, it is preferable that the drive control portion is controlled so that a torque of the drive portion is increased as the first set numerical value approaches at least one of the second set numerical values within the allowable range and the torque of the drive portion is decreased when the first set numerical value is in the vicinity of at least one of the second set numerical values. Thus, it is possible for the operator to sensitively feel by the fingers that the set numerical values are approached and remote away, thereby make sure the operation.

According to the present invention, it is preferable that the drive control portion is controlled so that respective torque changes in response to the plurality of second set numerical values become changes which are different from each other within the allowable range. Thus, the operator may distinguish the plurality of set numerical values only by the finger sense.

According to another aspect of the present invention, there is provided an operating knob device having: a position detection portion for detecting a position of a set numerical value of an object to be set; a rotary operating portion for changing and operating the set numerical value; a drive portion for rotatively driving the operating portion; and a control portion for controlling the drive portion on the basis of a detection result of the position detection portion. The control portion includes: a first position calculation portion for calculating a first set numerical value that is a current set numerical value of the object to be set, on the basis of the detection result of the position detection portion; a second position calculation portion for calculating one or a plurality of second set numerical values that are set numerical values before change of the object to be set, on the basis of the detection result of the position detection portion; and a drive control portion for controlling the drive portion to be rotatively driven and changing and controlling a drive parameter of the drive portion when an absolute value of a difference between the first set numerical value and at least one second set numerical value falls within an allowable range.

According to the present invention, the drive portion may be applied to the rotary type device.

According to still another aspect of the invention, there is provided an operating knob device comprising: a position detection portion for detecting a position of a set numerical value of an object to be set; a linear operating portion for changing and operating the set numerical value; a drive portion having a rotary portion for rotatively driving and a power translating portion for converting the rotational motion of the rotary portion into a linear motion for moving the operating portion in a linear manner; and a control portion for controlling the drive portion on the basis of a detection result of the position detection portion. The control portion includes: a first position calculation portion for calculating a first set numerical value that is a current set numerical value of the object to beset, on the basis of the detection result of the position detection portion; a second position calculation portion for calculating one or a plurality of second set numerical values that are set numerical values before change of the object to be set, on the basis of the detection result of the position detection portion; and a drive control portion for controlling the drive portion to be rotatively driven and changing and controlling a drive parameter of the drive portion when an absolute value of a difference between the first set numerical value and at least one of the second set numerical values falls within an allowable range.

According to this invention, it is available even in the case where the drive portion is driven in a linear manner.

Also, according to the present invention, the electronic equipment having a single or a plurality of the above operating knob devices is defined. Thus, it is possible to perform the reset operation for the plurality of operating knob devices only in accordance with the finger sense without visual observation. Accordingly, it is possible to perform the reset operation quickly by using the two hands of the operator or by combining the plurality of fingers of even one hand and thereby operating each of the plural operation knobs and the like. This may be applied to any type of electronic equipment.

BRIEF DESCRIPTION OF THE DRAWINGS

FIG. 7A is an explanatory diagram showing a position of a target position outputted from a second position calculation portion.

FIG. 7B is a graph showing a change of a drive torque of a drive portion in the vicinity of a target position.

FIG. 7C is a graph in the case where such a sense that a mechanical detent is simulated for an operating knob is given to the operator in the vicinity of the target position.

FIG. 18A is an explanatory diagram of the case where two target positions are set.

FIG. 18B is an explanatory diagram of an example simulating the mechanical detent of FIG. 18A.

FIG. 18C is an explanatory diagram of an example where a number of target positions are arranged at an equal interval.

FIG. 19A is an explanatory diagram of a case where three target positions are set.

FIG. 19B is an explanatory diagram of an absolute value of the drive torque of the drive portion in case of FIG. 19A.

FIG. 22 is a functional block diagram showing a detail of the structure of FIG. 21.

FIG. 23 is a rotary encoder used as a position detechion portion in the embodiment of FIG. 1.

DESCRIPTION OF THE PREFERRED EMBODIMENTS FIRST EMBODIMENT

1. STRUCTURE

1-1. OVERALL STRUCTURE

Figure 1:
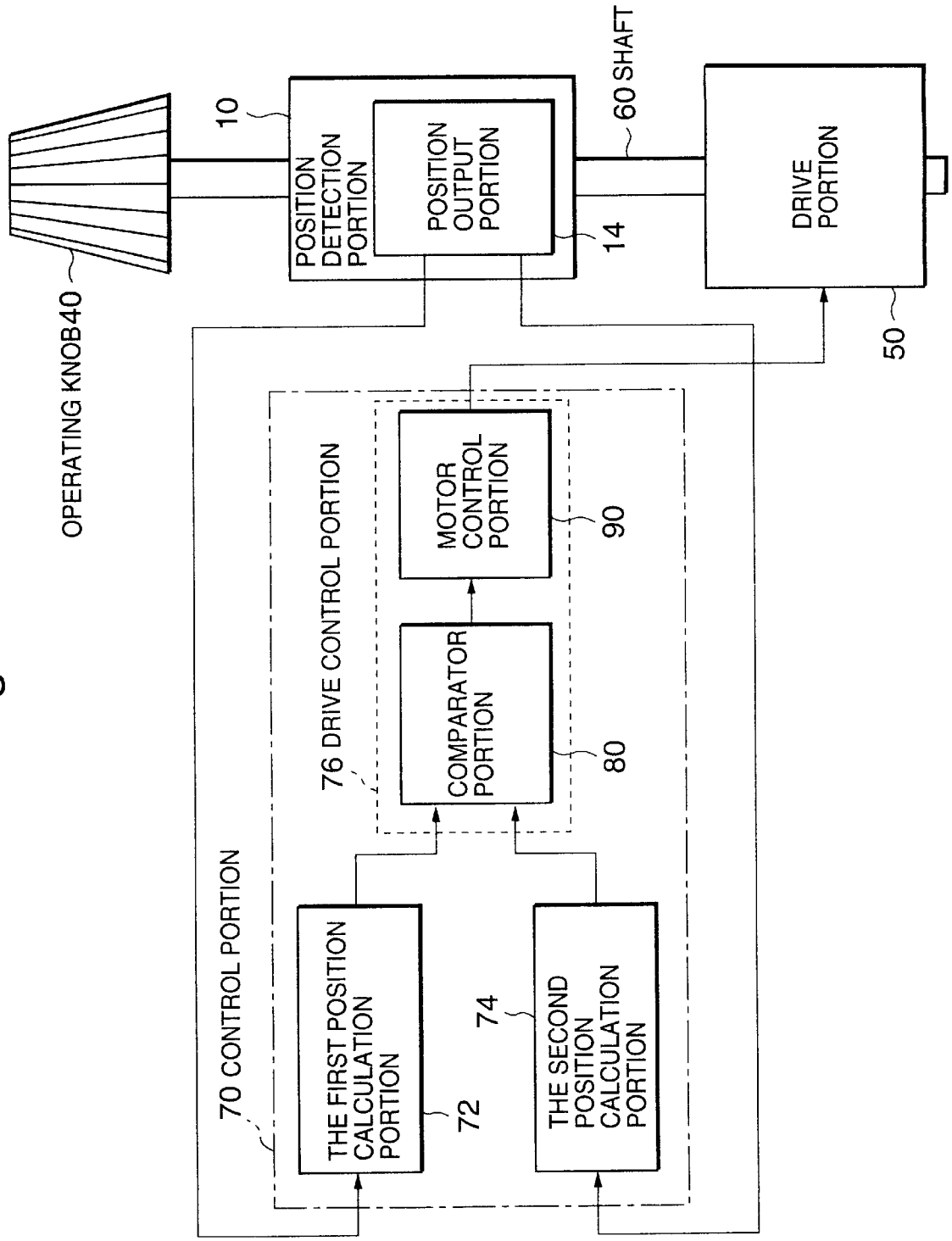
FIG. 1 is a functional block diagram showing an example of an operating knob device in accordance with a preferred embodiment of the present invention.

An overall structure of the present invention will now be described with reference to FIG. 1. FIG. 1 is a block diagram showing an operating knob device in accordance with a preferred embodiment of the present invention. The operating knob device 1 includes a position detection portion 10 for detecting a position of a set numerical value, an operating knob 40 that is an operating portion, a drive portion 50 for driving the operating knob 40, a shaft 60 for coaxially rotatably connecting the positional detection portion 10, the operating knob 40 and the drive portion 50 with each other, and a control portion 70 for controlling the drive portion 50.

The position detection portion 10 includes a position output portion 14 for outputting the position. It is preferable that the position output portion 14 includes a variable resistor whose resistance value is changed in response to a current rotational angle of the shaft 60 and a digital pontentiometer for outputting in terms of digital values an angle in the current rotational direction of the shaft 60. Then, the position output portion 14 outputs an absolute value of the current rotational angle of the shaft 60. For instance, if the shaft 60 has a rotational range of 270 degrees, the output value from the position detection portion 14 is in the range of 0 to 270 degrees corresponding to the angle.

The operating knob 40 is operated by the operator's fingers. When the operating knob 40 is rotated by the operator, the shaft 60 on which mounted are the position output portion 14 and the drive portion 50 is rotated.

The drive portion 50 is preferably composed of, for example, an electrical motor that may rotate in the forward direction and the reverse direction. The drive portion 50 may drive the position output portion 14 clockwise and counter-clockwise through the shaft 60.

The control portion 70 includes a first position calculation portion 72 for calculating a current position (first set numerical value) on the basis of the output data from the position output portion 14 (the detected position data of the position detection portion 10), a second position calculation portion 74 that is a position before being changed and operated by the operating knob 40 and for calculating a target position of the reset operation (second set numerical value), and a drive control portion 76 for controlling the drive portion 50 on the basis of the positional data from the first position calculation portion 72 and the second position calculation portion 74 and changing and controlling a drive parameter (for example, torque or the like) of the drive portion 50.

The first position calculation portion 72 into which the value corresponding to the current angle of the position output portion 14 is inputted calculates the current position.

The second position calculation portion 74 captures and registers the position of the operation knob 40 before the operating knob 40 is operated to thereby calculate the target position that becomes a target upon reset. This second position calculation portion 74 outputs a value corresponding to an angle of the target position.

The value corresponding to the angle outputted from the second position calculation portion 74 is a value corresponding to an angle between zero to 270 degrees in order to compare it with the current rotational angle of the position output portion 14.

As shown in FIG. 1, the drive control portion 76 is composed of a comparator portion 80 and a motor control portion 90.

The comparator portion 80 compares the output value of the second position calculation portion 74 for calculating the target position with the output value of the first position calculation portion 72 for calculating the current position in a real time manner. The motor control portion 90 drives the drive portion 50 on the basis of the output of the comparator portion 80.

In the operating knob device 1 having the structure as described above, the operating knob 40 is operated so that the current first set numerical value approaches the target second set numerical value. Then, the difference between the first set numerical value and the second set numerical value reaches a certain allowable range, and the drive portion 50 is driven so that the operating knob 40 to reach automatically the target second set numerical value.

1-2. OPERATING PORTION

Figure 4:
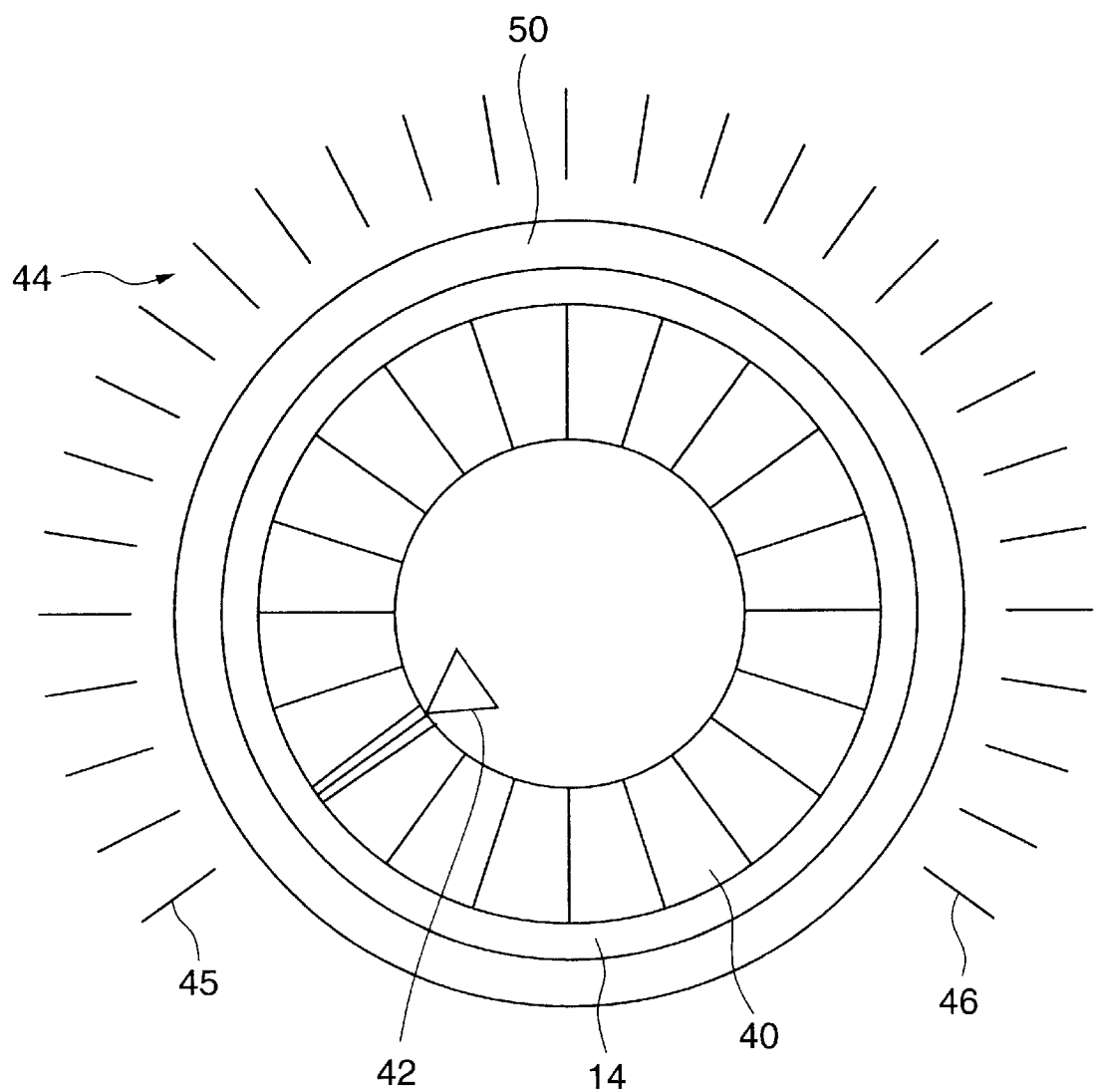
FIG. 4 is a plan view of the operating knob as viewed from the top.

FIG. 4 is a plan view of the operating knob 40 as viewed from the top. A mark 42 for the operator to know the current rotational position is printed on the operating knob 40.

The operating knob 40 may be rotated between a scale 45 indicative of the zero and a scale 46 indicative of 270 degrees in terms of a scale 44 indicating the angle provided around the operating knob 40.

1-3. CONTROL PORTION

Figure 2:
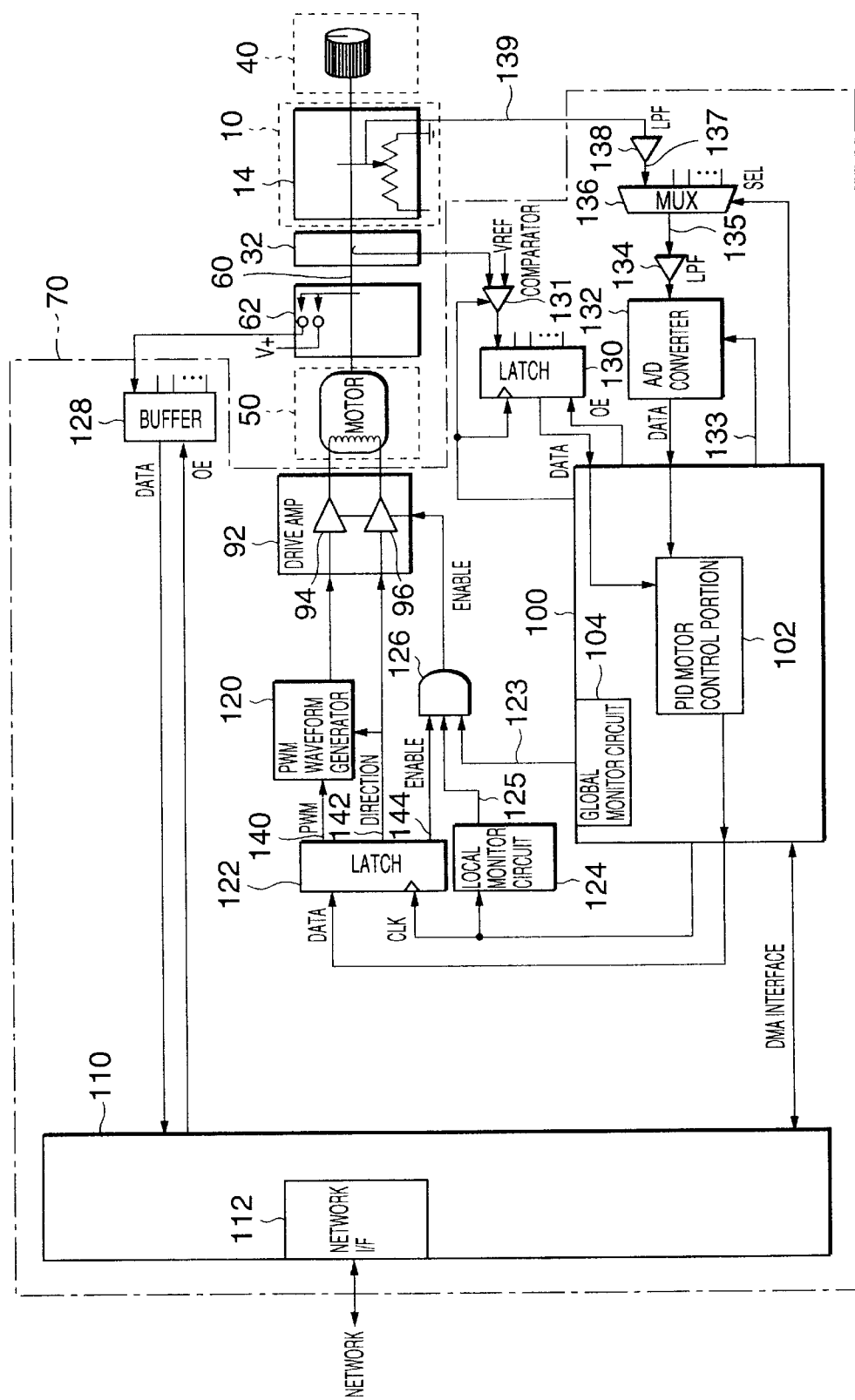
FIG. 2 is a block diagram showing a circuit structure of FIG. 1 in detail.

FIG. 2 is a block diagram showing a detailed structure of the hardware shown in FIG. 1. The above-described operating knob device shown in FIG. 1 may be realized by a variety of software structures and the hardware structure shown in FIG. 2, for example. Accordingly, in order to form the structure shown in the functional block diagram of FIG. 1, the invention is not limited to the hardware structure shown in FIG. 2.

Namely, it is not always necessary to cause each block within the control portion 70 shown in FIG. 1 showing the functional structure with the combination of the software and the hardware and each block within the control portion 70 of FIG. 2 showing the hardware structure to correspond to each other. In brief, it is sufficient that the components have the same function as a device. For example, the first position calculation portion 72 may be composed, in combination of an A/D converter 132, a DSP (digital signal processor) 100 and a microprocessor 110. This is the case in the second position calculation portion 74. The comparator portion 80 may be composed of the DSP 100 and the microprocessor 110. Also, the motor control portion 90 may be composed of a latch circuit 122, a PWM (pulse width modulation) waveform generator circuit 120, a drive amplifier 92 and an AND gate 126, a local monitor circuit 124, the DSP 100, the microprocessor 110 and the like. In this case, in order to perform each kind of process, it is sufficient to load a control program corresponding to each process in advance. This will now be described in detail.

As shown in FIG. 2, the drive portion 50 is connected to the control portion 70. In this drive portion 50, a push button 62, a touch sensor 32, the position detection portion 10 and the operating knob 40 are coupled coaxially with each other on the shaft 60.

The control portion 70 is composed of the drive amplifier 92, the DSP (digital signal processor) 100, the PWM (pulse width modulation) waveform generator circuit 120, the latch circuit 122 that is a motor control circuit, the local monitor circuit 124, the AND gate 126, a latch circuit 130, a comparator 131, the A/D converter 132, a multiplexer 136 and an LPFs (low pass filters) 134 and 138.

The drive amplifier 92 includes first amplifier 94 and second amplifier 96. Depending upon the operational conditions of the first amplifier 94 and the second amplifier 96, in the drive portion 50, there are two kinds of conditions, i.e., the case where the current flows from the first amplifier 94 to the second amplifier 96 and the case where the current flows from the second amplifier 96 to the first amplifier 94.

When the current flows from the first amplifier 94 to the second amplifier 96, the drive portion 50 is drivingly rotated in the clockwise direction. On the other hand, when the current flows from the second amplifier 96 to the first amplifier 94, the drive portion 50 is drivingly rotated in the counterclockwise direction.

The DSP 100 includes a PID (proportional integral differential)-Motor-Control portion 102, a global monitor circuit 104, a memory portion not shown and the like.

The PWM waveform generator circuit 120 outputs a square wave that has been pulse modulated.

Three outputs are outputted from the latch circuit 122 that is a motor control circuit. An output relating to the pulse width of the PWM waveform is outputted from an output terminal 140. An output relating to the rotational drive direction of the drive portion 50 is outputted from an output terminal 142. An output of the judgment information as to whether or not the drive portion should be driven is outputted from an output terminal 144.

The operation of the above-described control portion 70 will next be explained. First of all, the detection signal 139 on the basis of the variable resistance from the position output portion 14 is inputted into the multiplexer 136 through the LPF 138 as an input signal 137. The multiplexer 136 selects and outputs any one of the input signals 137 on the basis of a serial signal SEL from the DSP 100 out of the respective input signals 137 that have been inputted thereto.

This outputted signal 135 is inputted into the A/D converter 132 in accordance with a control signal 133 on the basis of the DSP 100 through the LPF 134 to be converted into a digital value. The converted data (Data) is processed in the PID-Motor-Control portion 102 within the DSP 100.

On the other hand, the output from the touch sensor 32 is compared with a voltage Vref in the comparator 131 and is outputted on the basis of a control signal 129 from the DSP 100. Then, a latch circuit 130 outputs any one of the input signals on the basis of the control signal 129 from the DSP 100 out of a plurality of input signals.

Also, an OE (outenable) signal is inputted into the latch circuit 130 from the DSP 100 to thereby control the operational period or the nonoperational period of the whole latch circuit 130.

Furthermore, the local monitor circuit 124 inputs a control signal 125 into the AND gate 126 on the basis of a clock CLK from the DSP 100. An enable signal from the latch circuit 122, the control signal 125 from the local monitor circuit 124 and a control signal 123 from the global monitor circuit 104 within the DSP 100 are inputted into the AND gate 126, which issues an enable signal when all the control signals (Enable, 125, 123) are kept at a level of "H".

This enable signal has a function for controlling the operation and non-operation of the drive amplifier 92 as a whole.

The microprocessor 110 performs the input/output of the various control signals and data from the external network through the internal network interface 112. Also, the microprocessor 110 directly performs the input/output of the data between the memory within the DSP 100 and the internal memory (not shown) through a DMA (direct memory access) interface.

The data from a buffer 128 electrically connected to the push button 62 is inputted into the microprocessor while outputs the outenable signal OE for controlling the operation and non-operation of the buffer 128. This buffer 128 holds the data relating to the voltage from the push button 62.

1-4. MECHANICAL STRUCTURE

Figure 3:
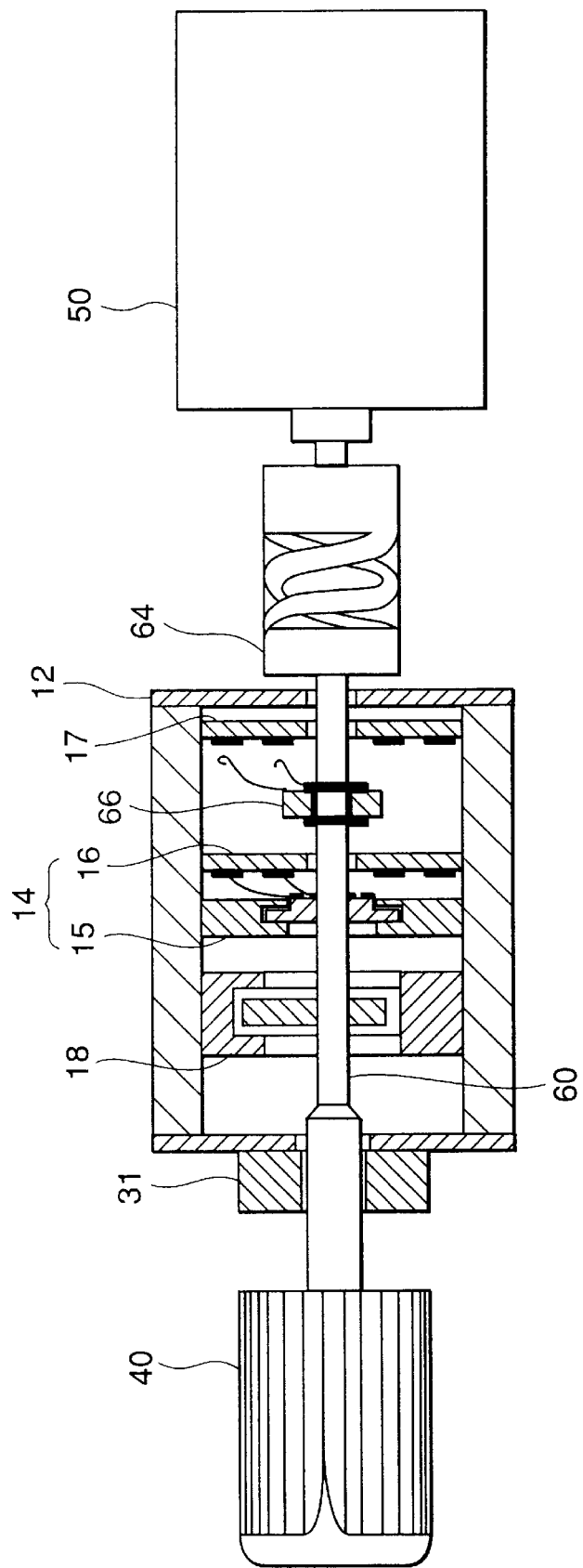
FIG. 3 is a fragmentary side view showing a mechanical structure of FIG. 1.

FIG. 3 is a fragmentary side view showing a mechanical structure of the operating knob device. In FIG. 3, in the same manner as in FIG. 1, in the operating knob device 1, the operating knob 40 that is made of conductive material and the drive portion 50 are connected through the metal made cylindrical shaft 60.

Then, the operating knob device 1 further includes a cylindrical housing 12, a compression spring 64 mounted around the shaft 60 and interposed between the housing 12 and the drive portion 50 and a conductive member 31 formed at a large diameter portion of the shaft 60 between the housing 12 and the operating knob 40 and connected to the touch sensor 32.

The compression spring 64 is made of elastic material such as resin, plastic or the like, and is constructed that the push button 62 is pushed to compress the compression spring 64. Also, the housing 12 and the drive portion 50 are electrically insulated from each other and a distance between the housing 12 and the drive portion 50 is adjusted to adjust the misalignment thereof on the shaft 60.

The housing 12 is a component to receive various components and includes a wiper mechanism 15 of the potentiometer slidingly moving along the shaft 60, a resistor element 16 of the potentiometer for outputting the signal in proportion to the rotational angle, a switch element 17 of the potentiometer having substantially the same function as that of the resistor element 16 for outputting a value that is smaller than that of the resistor element 16, a stop mechanism 18 fitted slidably along the shaft 60 to be rotatable through 360 degrees, and a push button wiper mechanism 66 fixed to the shaft 60 for swinging together with the shaft 60 in response to the operation of the push button 62.

Incidentally, the position output portion 14 is not limited to the potentiometer but may be an encoder or the like for measuring the current position.

Also, the compression spring 64 operates slidingly along the shaft 60 in accordance with the operation of the push button 62 to thereby allow the housing 12 to move.

1-5. LATCH CIRCUIT 122

Figure 5:
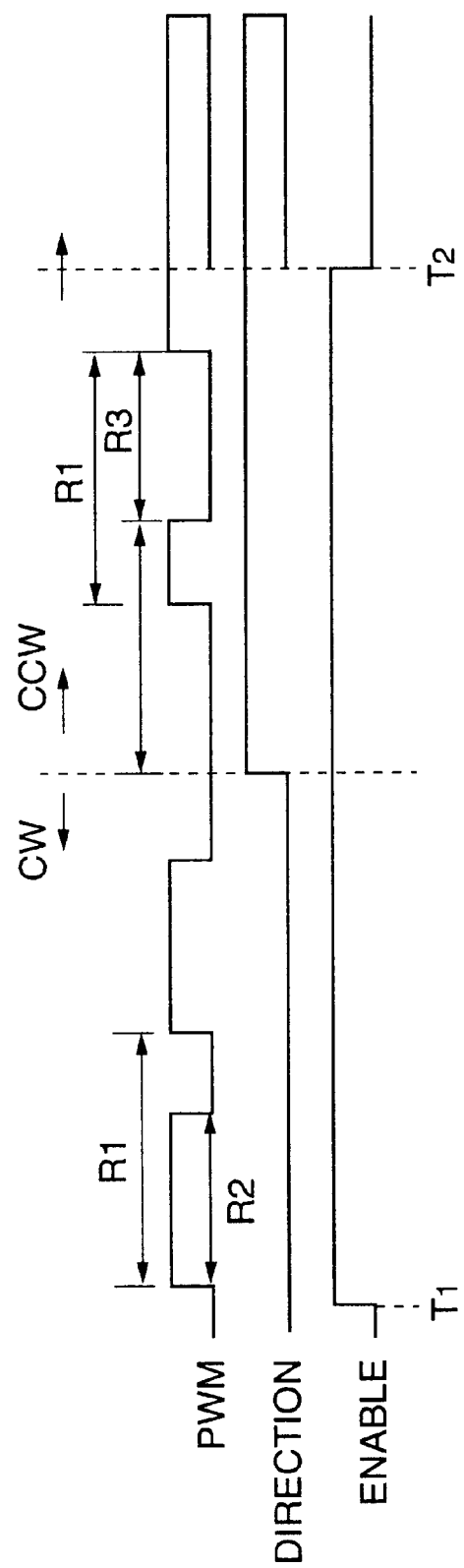
FIG. 5 is a timing chart showing the output of a latch circuit.

FIG. 5 illustrates the output of the latch circuit 122. In FIG. 5, from the top, there are shown the output (PWM) of the output terminal 140, the output (Direction) of the output terminal 142 and the output (Enable) of the output terminal 144, respectively.

First of all, as shown in FIG. 5, the drive portion 50 shown in FIG. 2 is driven only for the period from T1 to T2 during which the output of the output terminal 144 is a logical plus.

In FIG. 5, in the range indicated by CW, the drive portion 50 is rotatingly driven clockwise and in the range indicated by CCW, the drive portion 50 is rotatingly driven counterclockwise.

As shown in FIG. 5, a pulse signal having a cycle R1 is outputted from the output terminal 140. In the range where the output (Direction) of the output terminal 142 is in CW, the ratio, R2/R1, of the cycle R1 to the period R2 of the logical plus represents the power to be fed to the drive portion 50.

In the range where the output of the output terminal 142 is in CCW, the ratio, R3/R1, of the cycle R1 to the period R3 of the logical minus represents the power to be fed to the drive portion 50.

It is preferable that the value of R2/R1 or R3/R1 may be called from a ROM (read only memory) (not shown) connected to the latch circuit 122. For example, numerals such that R2/R1 is changed stepwise from 0.1 to 0.8 in the 32 stages may be recorded in the ROM and recalled when necessary.

Incidentally, since R3/R1 and R2/R1 are only reversed in the logic, it is unnecessary to prepare the data of the ROM for both but the 32 data may be utilized in common in the CW range and the CCW range.

1-6. RELATIONSHIP BETWEEN TARGET POSITION AND CURRENT POSITION

Figure 6A:
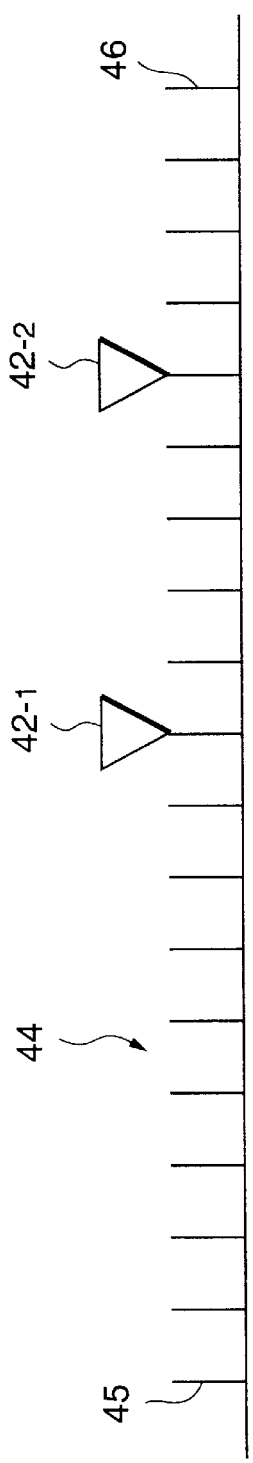
FIG. 6A is an explanatory diagram of the scale, shown in FIG. 4, represented on a line.
Figure 6B:
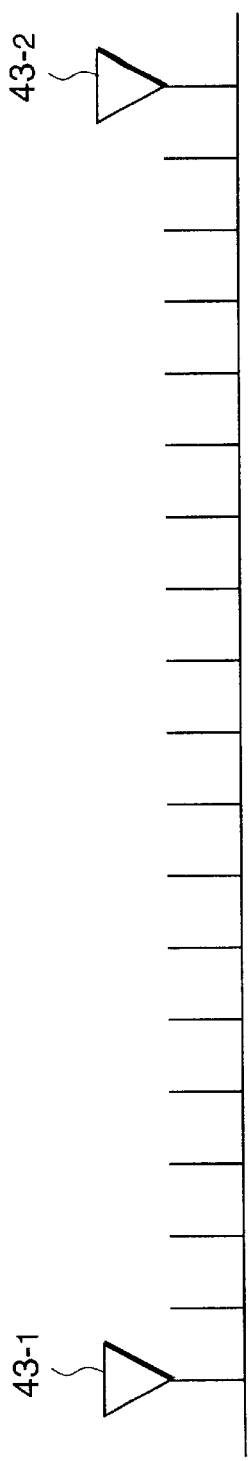
FIG. 6B is an explanatory diagram of a position in a rotational direction of the operating knob shown in FIG. 2.

FIG. 6A is an explanatory diagram of the scale 44, indicated in FIG. 4, represented in a line. FIG. 6B illustrates the position in the rotational direction of the operating knob 40 shown in FIG. 2.

Figure 6C:
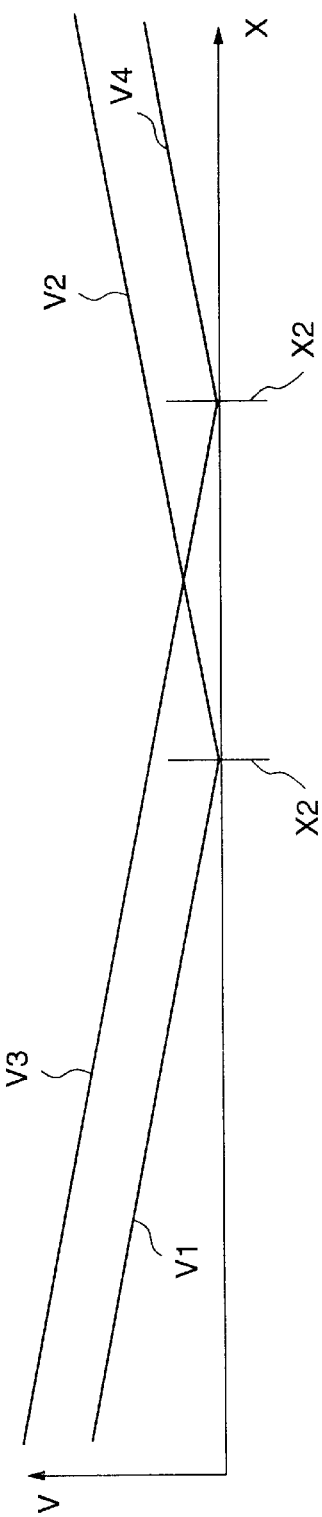
FIG. 6C is an operative explanatory diagram for illustrating the operation of a comparator portion.

Here, the target positions calculated in the second position calculation portion 74 shown in FIG. 1 are indicated by, for example, symbols 42-1 and 42-2 of FIG. 6A. The rotational directional position (i.e., the position in the rotational direction of the operating knob 40) calculated in the first position calculation portion 72 of FIG. 1 are indicated by, for example, symbols 43-1 and 43-2. FIG. 6C illustrates the absolute values of the outputs of the comparator portion 80.

In FIG. 6A, now, when the target position is in the position indicated by 42-1, the value outputted from the comparator portion 80 changes due to the difference between the target position 42-1 and the current position of the operating knob 40. The V1, X1 and V2 of FIG. 6C indicate the values. V1 is the case where the position of the operating knob 40 is closer to the position 43-1 relative to the target position 42-1 and V2 is the case where the position of the operating knob 40 is closer to the position 43-2 relative to the target position 42-1.

When the target position 42-1 is identified with the current position of the operating knob 40, the output of the comparator portion 80 becomes zero as indicated by X1. In the same manner, the outputs of the comparator portion 80 in the case where the target position is 42-2 are V3, X2 and V4.

1-7. DETENT

FIG. 7A illustrate the position of the target position 42-1 outputted from the second position calculation portion 74. FIG. 7B is a graph showing the change of the drive torque of the drive portion 50 in the vicinity of the target position 42-1. FIG. 7C illustrates the case where the feeling for simulating the mechanical detent for the operating knob 40 is given to the operator.

Here, the mechanical detent means a click feel that has been extensively used in a mechanical switch. For example, in the actual mechanical detent, a groove is provided in the longitudinal direction of the shaft of the operating knob 40 and a ball is depressed against the groove by a spring. If the operating knob 40 is rotated, it is possible to obtain the click feel at the portion where the ball drops into the groove.

In this example, without forming such a mechanical structure, the structure is provided such that the same feel as that of the mechanical detent may be obtained in accordance with an electric control. The principle thereof will now be described.

In FIG. 7A, D1 and D2 are the positions in the rotational direction relative to the target position 42-1. For example, the difference between the target position 42-1 and D1 is three degrees and the difference between the target position 42-1 and D2 is three degrees. The process where the operating knob 40 approaches the target position 42-1 from the outside of D1 by the operation of the operator to be identified with the target position 42-1 will now be described.

First of all, when the operating knob 40 reaches D1, as shown in FIG. 7B, the torque $\tau1(x)$ is increased as closer to the target position 42-1. Then, when D4 is reached, the torque $\tau2(x)$ is abruptly decreased. Finally, in the very narrow range between D5 and D6, a weak torque $\tau3(x)$ is maintained.

It is sufficient that the angle in the range of the weak torque $\tau3(x)$ between D5 and D6 is two degrees or less, and in some cases, that D5 and D6 are set at the same point so that the range of the weak torque $\tau3(x)$ may be zero.

The reason why the range of the weak torque $\tau3(x)$ is provided in the range between D5 and D6 is that the center point of the mechanical detent is clearly given to the operator.

Furthermore, when the operating knob 40 is to be rotated in the direction indicated by D2, the torque $\tau4(x)$ is abruptly increased between D6 and D7.

Finally, the torque $\tau5(x)$ is gradually decreased between D7 and D2. Such a change in torque is well similar to the mechanical detent. Incidentally, the change in torque shown in FIG. 7B depends upon an offset angle of the operating knob 40 relative to the target position 42-1.

Namely, as shown in FIG. 7C, the torque corresponding to the offset angle may be defined. The value shown in FIG. 7C is in proportion to the torque. Namely, in the range of $\tau1(x)$, the values $\tau1(x1), \tau1(x2), \tau1(x3), \ldots$ meeting the relation, $\tau1(x1)<\tau1(x2)<\tau1(x3)<\ldots$ are given. In the range of $\tau2(x)$, the values $\tau2(x10), \tau2(x11), \tau2(x12)$ and $\tau2(x13)$ meeting the relation, $\tau2(x10)>\tau2(x11)>\tau2(x12)>\tau2(x13)$ are given. It is preferable to read out these values from the ROM (not shown) connected to the latch circuit 122 that is the motor control circuit.

Also, in the outside of the D1 and D2, there is shown the example where the weak torques $\tau6(x)$ and $\tau7(x)$ are generated in the drive portion 50. The reason for this is that a torque for a weak resistance feel is given to the operator when the operator rotates the operating knob 40.

Accordingly, if the operating knob device 1 shown in FIG. 1 inherently has a sufficient frictional torque, the torque $\tau6(x)$ and $\tau7(x)$ may be zero.

1-8. DSP ALGORISM

The DSP 100 has various software algorisms and performs the two processes. The first process is to receive a command from the microprocessor 110 through a DMA interface and recognize the command. In this first process, special information relating to a detent function such as a detent position or a torque (detent force) is stored in a memory (not shown) or the like within the DSP 100.

The second process is to periodically interrupt the program for controlling the detent position or the current position by the drive portion 10. Namely, a timer is programmed to interrupt the processor of the DSP 100 once for one second, for example.

Then, in this second process, a new value of the A/D converter 132 and a new value of the touch sensor are inputted into the DSP 100. Then, after the analog data has passed through the LPFs 134 and 138 for removing the noise caused by the vibration of the shaft, the analog data is converted into digital data in the A/D converter 132. Incidentally, in order to perform the A/D conversion, it is necessary to execute the setup process of the A/D converter 132 per se before execution of the process for the conversion.

Also, the algorisms installed in the DSP 100 are categorized into a touch algorism and a detent algorism.

The touch algorism is to provide a debounce (repulsive force, spring back) function and a hysteresis. This touch algorism is utilized when the contact event develops. Then, a touch flag is given on the basis of the output of the touch sensor circuit to execute the algorism.

In the noncontact manner, the process for processing the normal demand position is performed. Namely, the positional information demanded from the microprocessor 110 is utilized for controlling the motor for moving the operating knob 40 to the position.

The detent algorism works upon the contact. At this time, the value of the A/D converter 132 outputs the current positional information of the operating knob 40. This position is compared with the detent position (target position) in the center of the detent region.

The detent position is stored in an initialized table. When the detent position is changed, the detent position table is renewed to a new detent position table.

Also, a region width or a region size when the detent position has been determined is stored in a torque (detent force) table. The torque of the shaft 60 is utilized in the torque table. This is utilized in (a duty cycle of 0/32 to 31/32) in terms of the PWM waveform. Thus, it is possible to perform the motor drive gently up to the specified position while simulating the feel of the mechanical detent.

Figure 11:
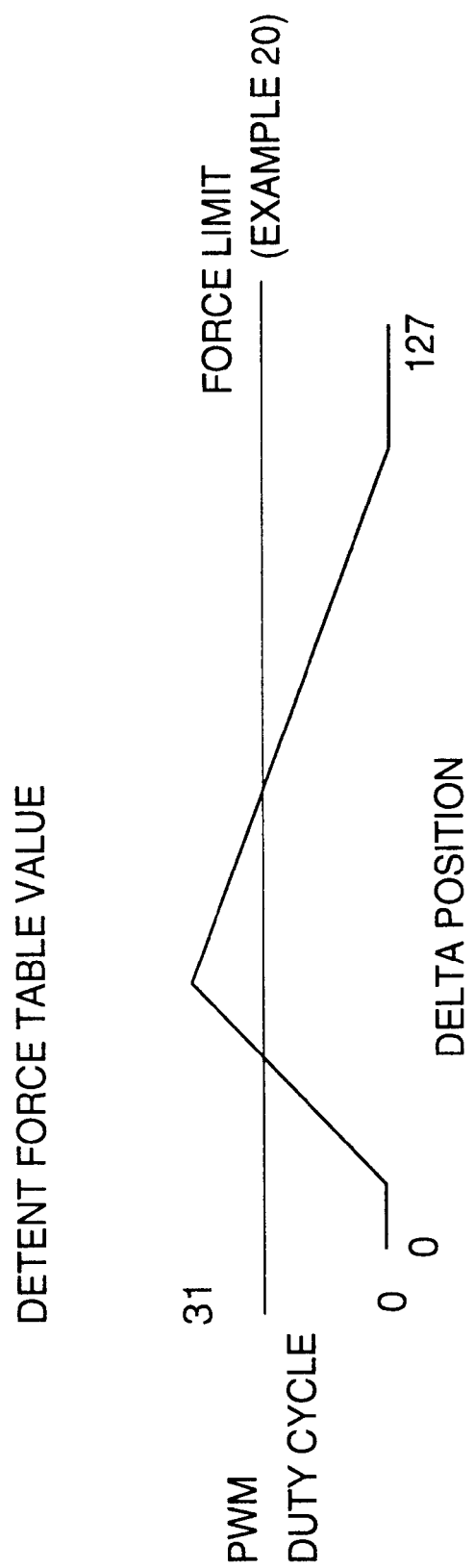
FIG. 11 is an explanatory diagram showing a table for defining a relationship between a value of a PWM waveform and a detent force (torque).

Furthermore, in the value of this torque table, as shown in FIG. 11, the torque is formed in a right and left asymmetrical algorism by the value of the PWM waveform. Here, the torque may be scaled by programming the limit variables. Thus, the detent position is readily changed to a desired position or set to a plurality of positions to execute the drive portion 50 to take a linear motion and a swivel motion. It is therefore possible to control the feel generated in the operating knob 40.

1-9. TOUCH SENSOR

Figure 8:
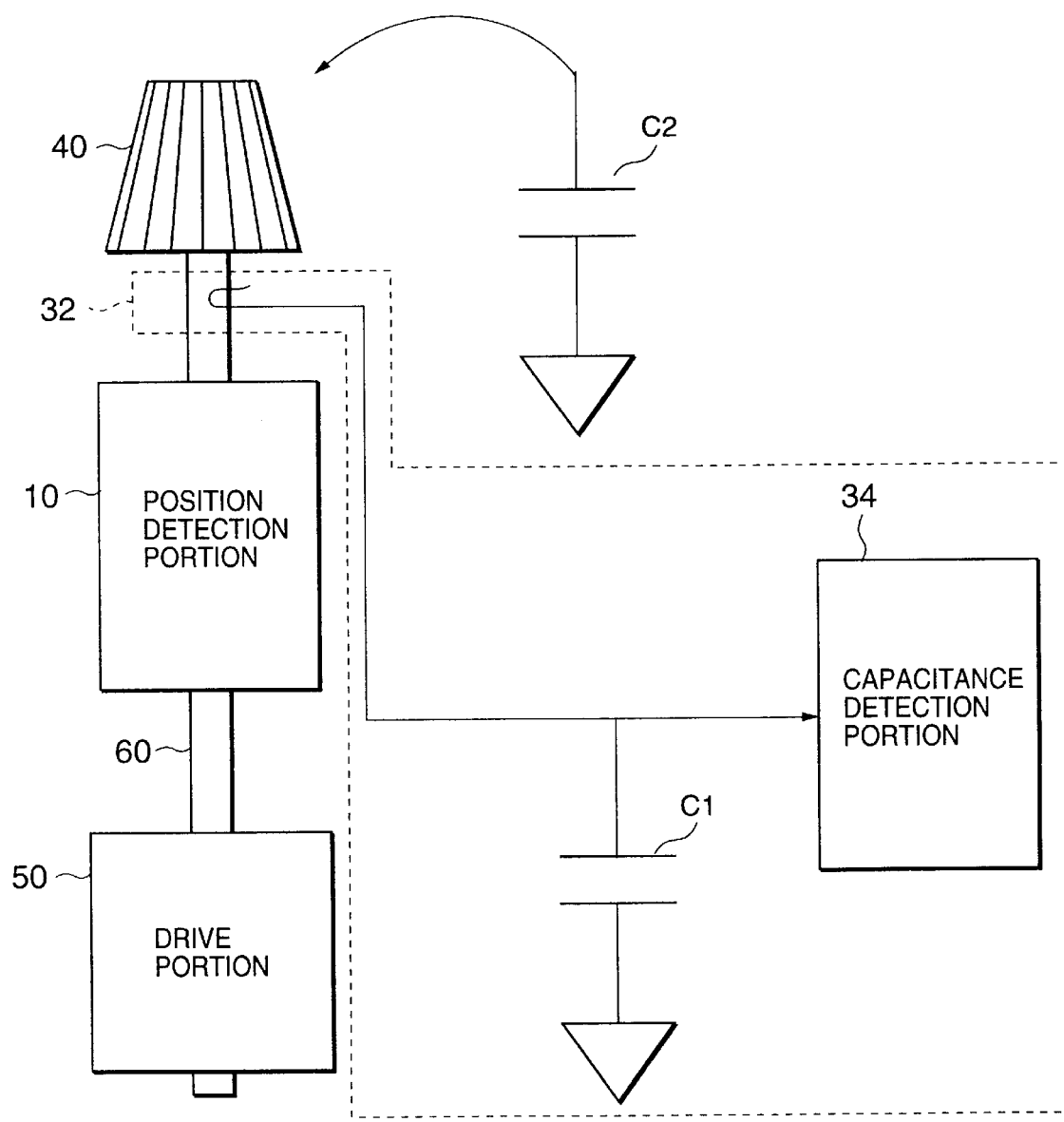
FIG. 8 is a block diagram showing a structure of a touch sensor.

FIG. 8 is an explanatory diagram of a structure of the touch sensor 32 as a detection portion. The drive portion 50 shown in FIG. 1 is not always fed with the electric power. Namely, when the operator does not touch the operating knob 40, the electric power is not supplied to the drive portion 50. The touch sensor 32 shown in FIG. 8 detects whether or not the operator touches the operating knob 40. Therefore, the operating knob 40 and the shaft 60 are made of conductive material, respectively.

A capacitor C1 is connected to the shaft 60 and the shaft 60 and the capacitor C1 are connected to a capacitance detection portion 34.

On the other hand, when the operator touches the operating knob 40 by his fingers, the equivalent condition where the capacitor C2 is connected takes place. Although the value of the capacitor C2 greatly changes depending upon the circumstances, this constitutes a circuit connected in parallel with the capacitor C1.

The capacitance detection portion 34 is a circuit for detecting the change in capacitance of the capacitor C1 and detects whether or not the operator touches the operating knob 40. The capacitance detection portion 34 may be formed by, for example, a mono-stable multi-vibrator in which the cycle of pulse is changed or an oscillator circuit in which the oscillation frequency is changed when the capacitance of the capacitor C1 is changed. Namely, it is possible to exemplify a pulse width modulation oscillator 35 or the like as shown in FIG. 9 as this capacitance detection portion 34.

Figure 9:
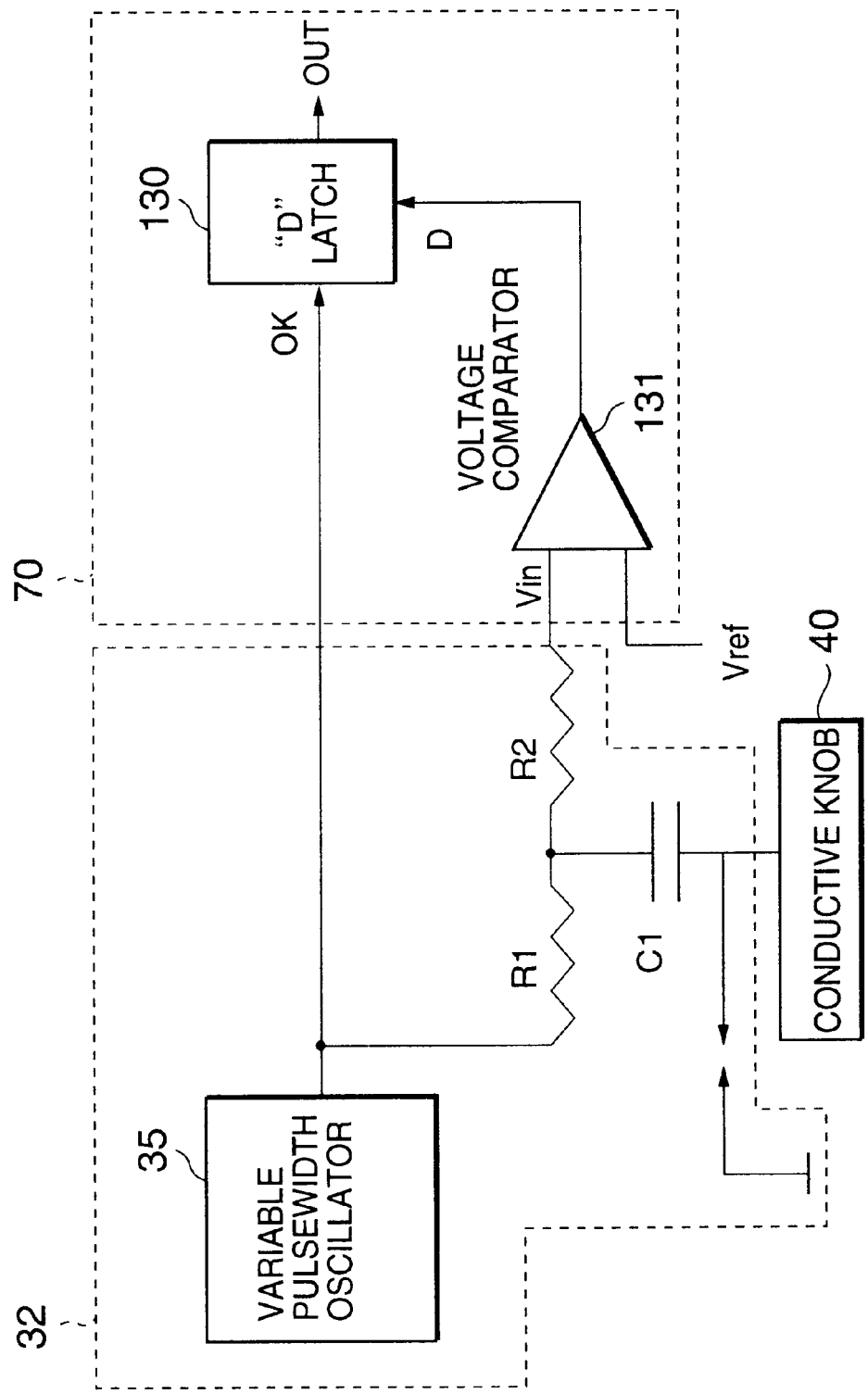
FIG. 9 is a block diagram of FIG. 8 in detail.

In FIG. 9, various detections or calculations are performed in the control portion 70 on the basis of the control signals from the touch sensor 32. This control portion 70 has a latch circuit 130 connected to the pulse width modulation oscillator 35 and a comparator 131 connected to this latch circuit 130.

It is preferable that the latch circuit 130 is formed by, for example, a D-type flip-flop circuit. A clock signal CK that is a trigger pulse to be inputted into the latch circuit 130 is inputted from the above-described pulse width modulation oscillator 35. Also, the comparator 131 compares the input voltage Vin whose waveform is changed when the operator touches the operating knob 40 with a predetermined constant voltage Vref. Incidentally, the resistor R2 is a protective resistor.

Figure 10:
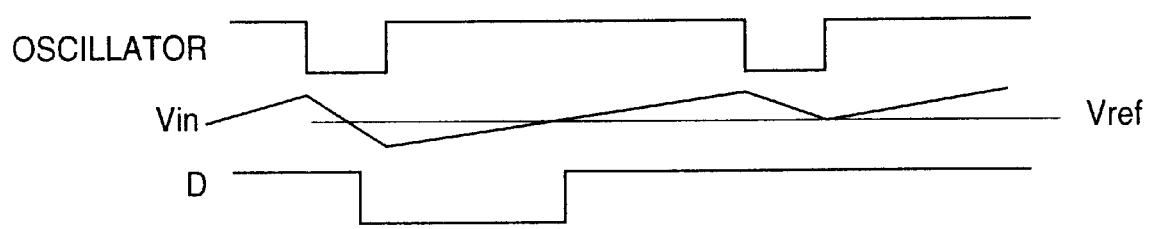
FIG. 10 is a timing chart showing the operation of the block diagram of FIG. 9.

Then, as shown in the timing chart of FIG. 10, first of all, when the operator does not touch the operating knob 40, the input voltage Vin is abruptly decreased by the resistor R1, the capacitor C1 and the resistor R2 before the output waveform of the pulse width modulation oscillator 35 is raised. A signal of "L" level is inputted from the comparator 131 into the latch circuit 130 at the timing of rise of the clock signal CK. Accordingly, when the operator does not touch the operating knob 40, the latch circuit 130 indicates the "L" level.

Subsequently, when the operator touches the operating knob 40, the capacitance C2 owned by the person is kept under the parallel connection with the capacitor Cl. Therefore, the input voltage Vin no longer decreases below the voltage Vref before the rise timing of the output waveform of the pulse width modulation oscillator 35. Thus, when the operator does not touch the operating knob 40, a signal of "H" level is inputted from the comparator 131 to the latch circuit 130.

Thus, in the touch sensor 32 according to this embodiment, during the contact with the operating knob 40, the input waveform of the input voltage Vin of the comparator 131 is changed. Thus, the logic of the latch circuit 130 is changed. This change is read out by the software algorism of the DSP 100 to thereby control the control portion 70. Incidentally, it is sufficient to change the pulse width of the pulse width modulation oscillator 35 in response to the sense of the fingers. Namely, the pulse width is made particularly small so that the sensitivity of the touch sensor 32 may be enhanced. Also, the output of the capacitance detection portion 34 may be utilized as the output of the output terminal 144 of the latch circuit 122 shown in FIG. 2.

Furthermore, in this system, a plurality of sensors may be used commonly in the single oscillator. In the case where thus designed system is applied to, for example, acoustic equipment or the like, the oscillator operates at a frequency set acoustically. Also, since the single oscillator uses a plurality of sensors, it is possible to reduce the number of the parts to aim the decrease of the circuit scale and reduction of cost therefor. Also, the pulse width modulation oscillator is linked with the computer or the microprocessor so that the sensitivity of all the sensors may be automatically adjusted.

2. PROCESSING OPERATION

2-1. OVERALL PROCESS

Figure 12:
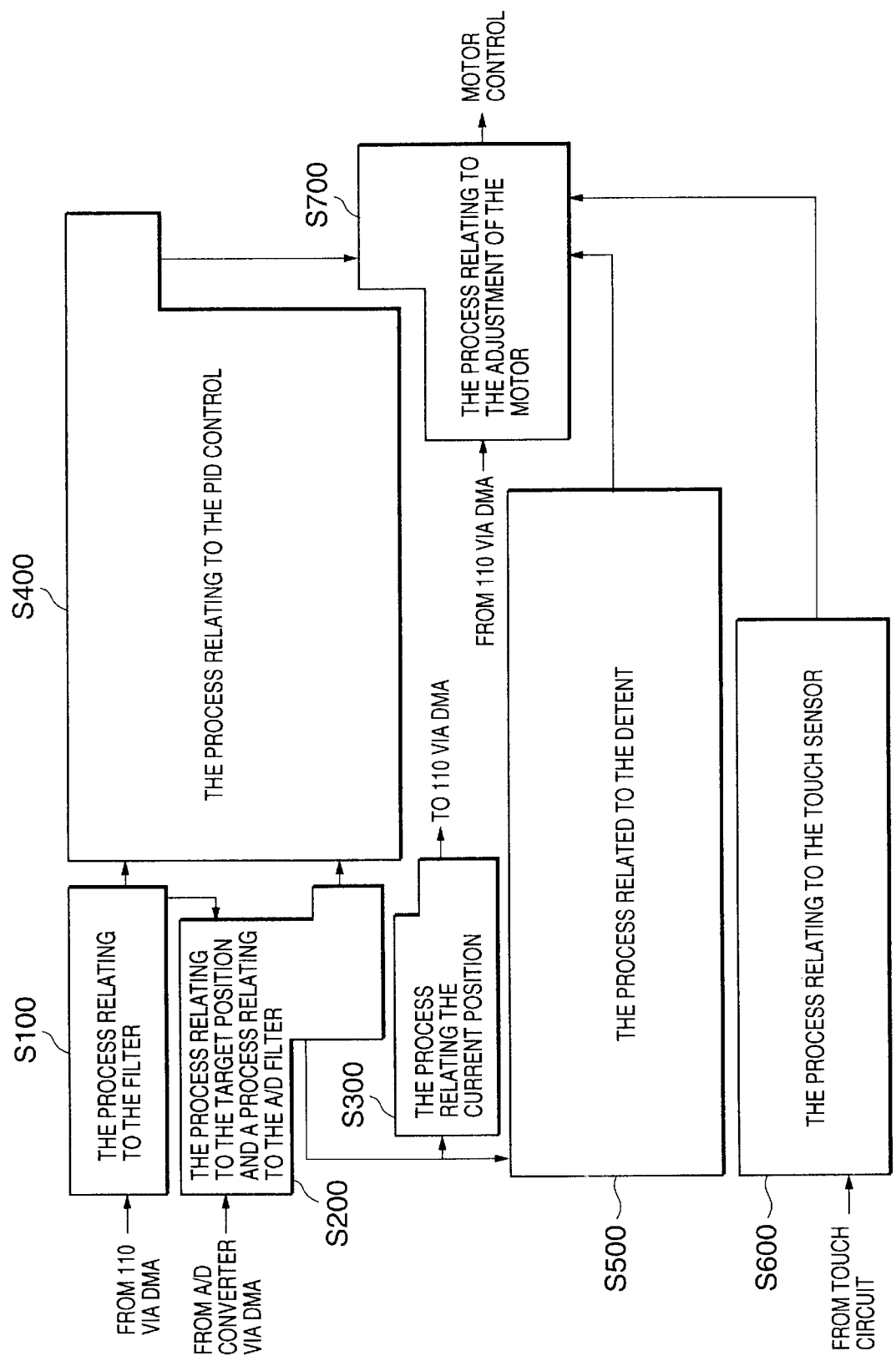
FIG. 12 is a block diagram showing a control algorism of an operating knob device according to the present invention.

The operation of the above-described operating knob device will now be described in more detail with reference to FIGS. 12 to 17. FIG. 12 is a block diagram showing a control algorism of the operating knob device according to the present invention.

In FIG. 12, first of all, a process relating to the filter on the basis of a command from the microprocessor 110 via a DMA (direct memory access) interface (hereinafter referred to as step s100). On the other hand, a process relating to the target position and a process relating to the A/D filter are performed on the basis of a demand from the A/D converter 132 via the DMA (s200). After the completion of steps s100 and s200, the process relating to the PID control is performed (s400).

On the other hand, after the completion of step s200, in step s300, the process relating to the current position, which is a post-process for the above-described processes, is performed. Also, the process related to the detent is performed (s500).

Furthermore, after the process relating to the touch sensor 32 on the basis of the demand from the touch circuit (s600) and after the respective processes of steps s400 and s500, the process relating to the adjustment of the motor is performed (s700). The output from this is used as a pulse for controlling the motor.

2-2. PROCESS ON FILTER

Figure 13:
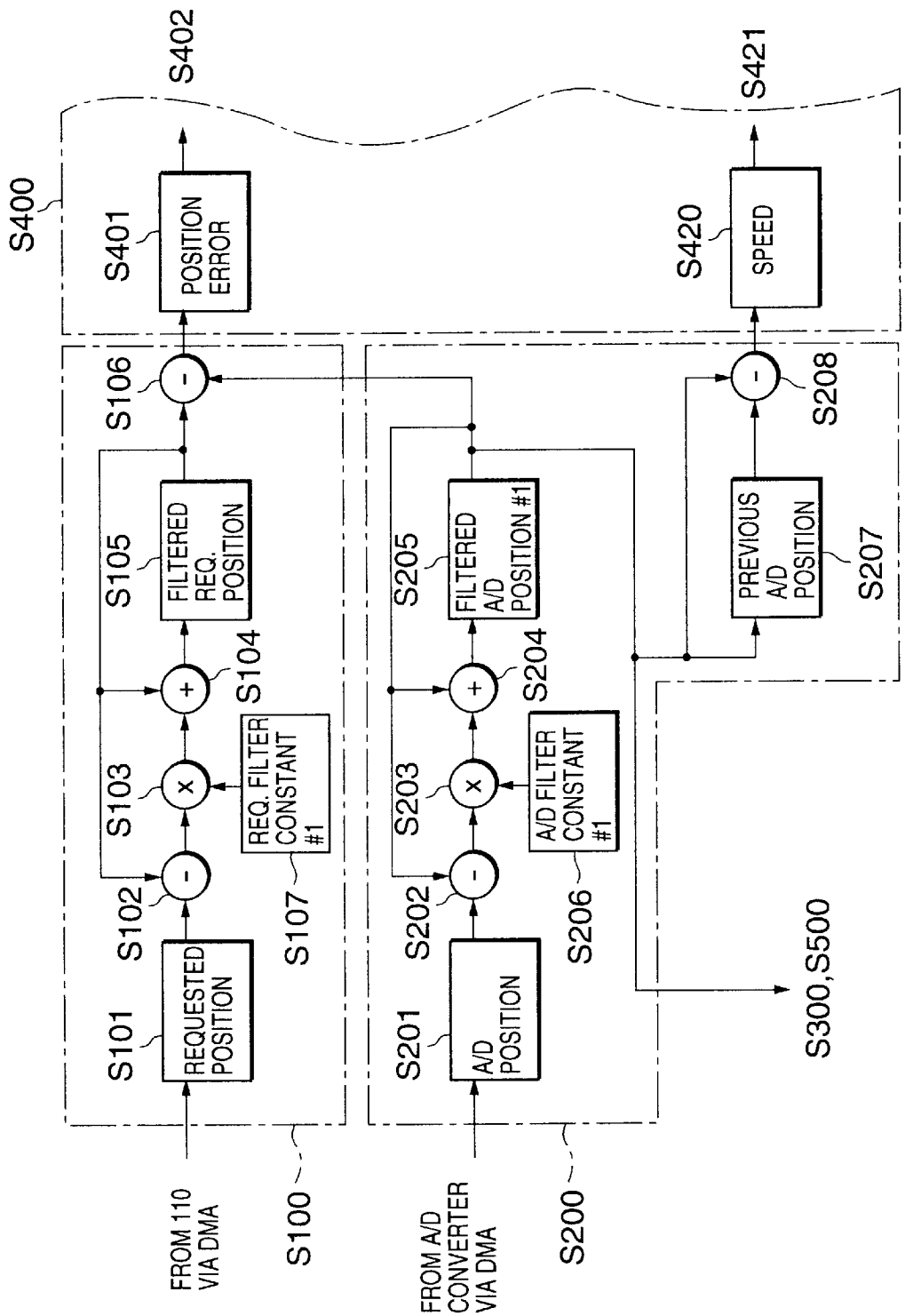
FIG. 13 is a block diagram showing a detail of a part of FIG. 12.

FIG. 13 is a block diagram showing steps s100 and s200 of FIG. 12 in more detail. In FIG. 13, first of all, a requested position is determined on the basis of the command from the microprocessor 110 (s101). Here, the difference between this position and the filtered and requested position is sought (s102), and the multiplication with a constant for the requested filter is performed (s103). Subsequently, in step s104, the sum with that position and the filtered and requested position is calculated to thereby determine the filtered and requested position (s105).

2-3. PROCESS ON A/D FILTER AND TARGET POSITION

On the other hand, as shown in FIG. 13, the A/D position is determined on the basis of the command from the A/D converter 132 (s201). Subsequently, the difference between this position and the positional information that is the output of the A/D converter 132 and is filtered at the LPF 138 in step s202. Furthermore, the multiplication with the A/D filter constant (s206) is sought (s203), and the sum with the positional information that is the output of the A/D converter 132 and is filtered at the LPF138 is sought (s204) to determine the filter position #1(s205). This result is inputted into steps s300, s500, s207 and s106, respectively.

When the result is inputted into step s207, the calculation of the previous A/D positional information (target position) (before the change operation of the operating knob) is performed (s207), and the difference from the data before calculation is determined in step s208.

When the result is inputted into step s106, the difference from the positional information after the requested filtration is sought (s106) to perform the calculation (s400) of the positional error.

2-4. PROCESS ON PID CONTROL

Figure 14:
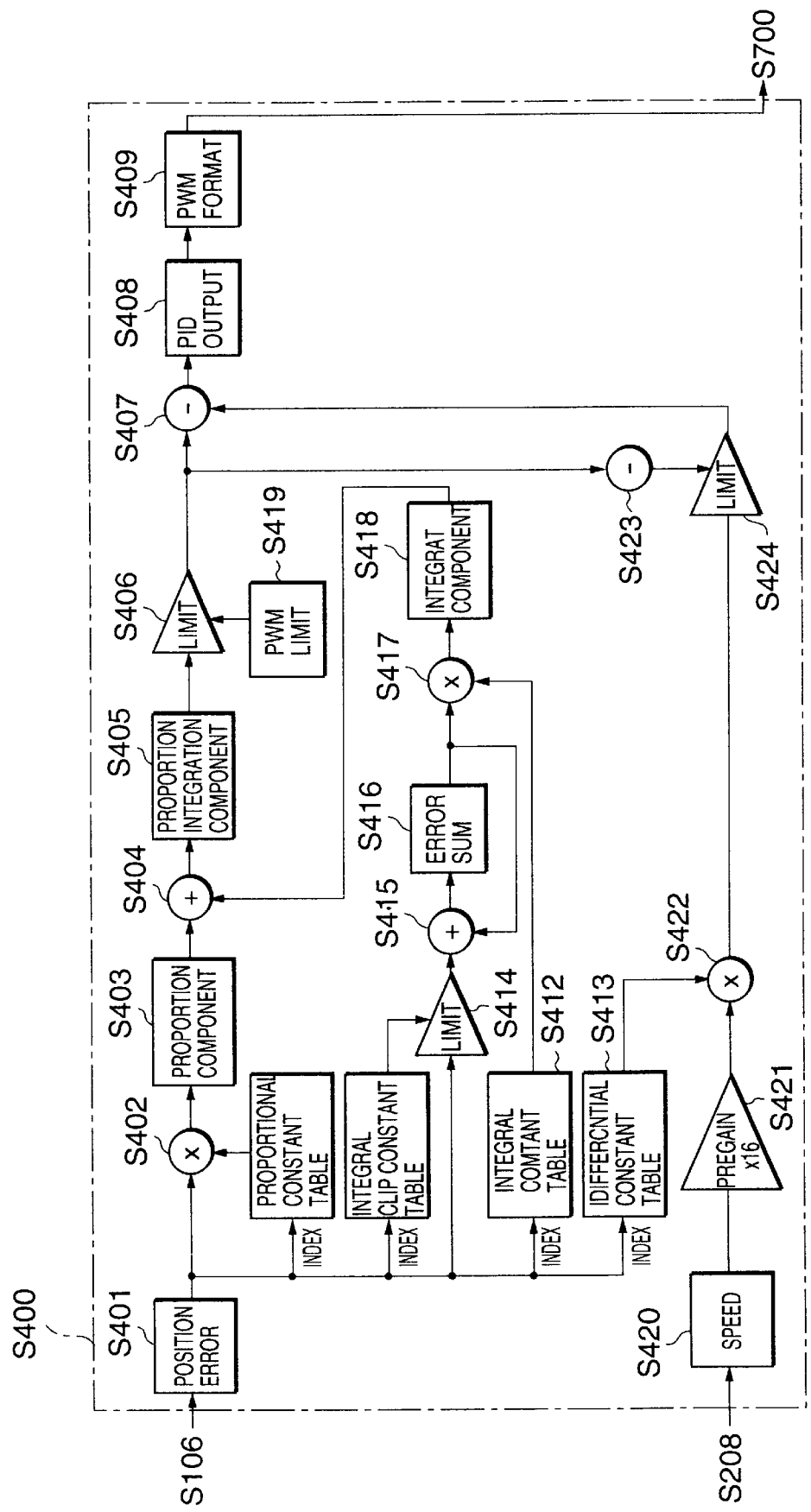
FIG. 14 is a block diagram showing a detail of a part of FIG. 12.

FIG. 14 is a block diagram of step s400 of FIG. 12 in detail. As shown in FIG. 14, when the calculation of the positional deviation (s401) is performed, the data are selected on the basis of the respective data input from the corresponding tables of the proportional constant table (s410), the integration division (range) constant table (s411), the integration constant table (s412), the differential constant table (s413) and the limit calculation portion (s414). Namely, in the proportional constant table (s410), the proportional constant is sought to calculate the product of the proportional constant by the positional deviation (s402). When calculated, the proportional synthetic component is calculated in the proportional synthetic portion (s403).

The limit is calculated on the basis of the output data from the integration division (range) constant table (s411) and the positional deviation (s414). The total sum of the deviation (s416) for this calculation data is sought by seeking the sum with the data from the total sum (s416) of the deviation (s415). The product of this data by the data from the integration constant table (s412) is sought (s417). The integration synthetic component is calculated in the integration synthetic portion (s418). This integration component and the proportional component are added together in step s404 to calculate the proportional-integration component (s405). The limit is calculated on the basis of the calculation data of the proportional-integration component and the data of the PWM (pulse width modulation) limit (s419) stored in advance (s406).

On the other hand, the velocity is calculated on the basis of the data from step s208 (s420). This velocity is amplified and calculated in, for example, an amplifier 16 in step s421 (s421). The amplified data and the data from the differential constant data (s413) are multiplied and the limit calculation is performed on the basis of the data from the step s406 in the step s424. On the other hand, on the basis of this result, the difference from the result of the step s406 is sought (s407), and as a result, the calculation of the PID output is performed (s408). Furthermore, from this result, the format of the PWM (pulse width modulation) is calculated (s409) and outputted to s700.

2-5. PROCESS ON CURRENT POSITION

Figure 15:
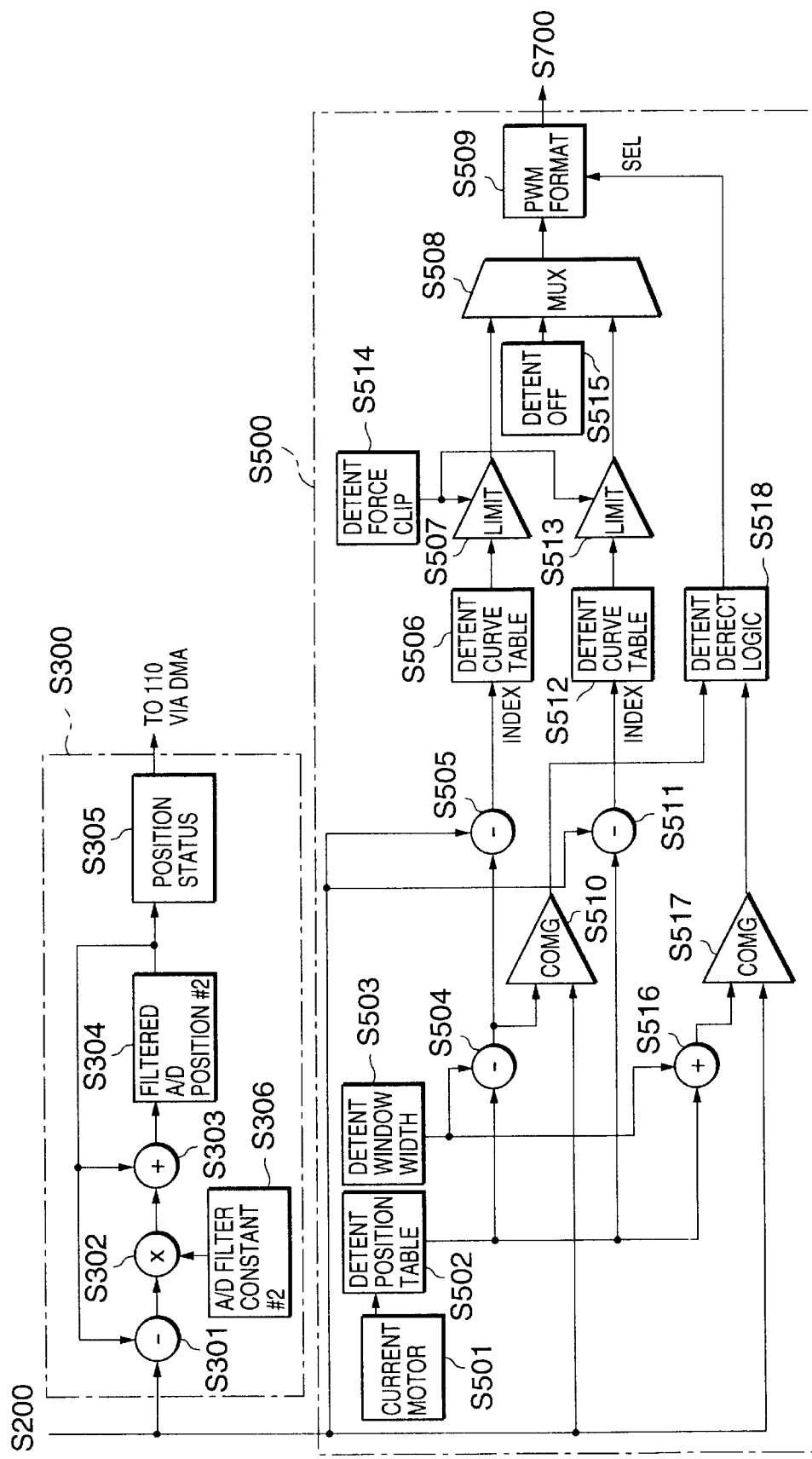
FIG. 15 is a block diagram showing a detail of a part of FIG. 12.

As shown in FIG. 15, in the same manner as in s200, the difference is sought (s301), the product is sought on the basis of the A/D filter constant #2 (s302), the sum is sought (s303) and the positional data #2 of the filtered A/D conversion is calculated (s304). Furthermore, on the basis of this result, the current position is calculated (s305). This result is transferred to the microprocessor 110 via the DMA.

2-6 PROCESS ON DETENT

FIG. 15 is a block diagram showing steps s300 and s500 in more detail. As shown in FIG. 15, first of all, on the basis of the motor current (s501), the corresponding data is outputted from the detent position table (s502).

Then, the data is also outputted from the detent window width (s503). The difference between the (detent signal) data from the detent position table and the data from the detent window (region) width is sought in step s504, and is compared with the data from step s200 in step s510. Moreover, the difference between the above-described difference and the data from step s200 is also sought (s505).

On the otherhand, the sumof the datafromthe detent position table and the data from the detent window width is sought in step s516, and compared with the data from step s200 in step s517.

The detent detect logic is formed on the basis of the comparison result of step s510 and the comparison result of step s517 (s518).

A gradient (torque) of the corresponding detent is calculated (s506) on the basis of the data from step s515 in the detent curve table (s506).

Also, the difference between the data from the detent position table and the data from step s200 is sought (s511), and in the detent curve table (s512), the gradient of the corresponding detent is calculated (s512).

The limit calculation for the data from step s506 is performed on the basis of the detent force (torque) (s514) in step s507. In the same manner, the limit calculation for the data from step s512 is performed on the basis of the detent force (s514) in step s513. These calculation results are inputted to the multiplexer (s508) together with the demand of the detent off (s515) and either one is selected on the basis of the serial signal SEL formed from S518. Thereafter, the PWM format is formed (s509) and is inputted into step s700.

2-7. PROCESS ON TOUCH SENSOR

Figure 16:
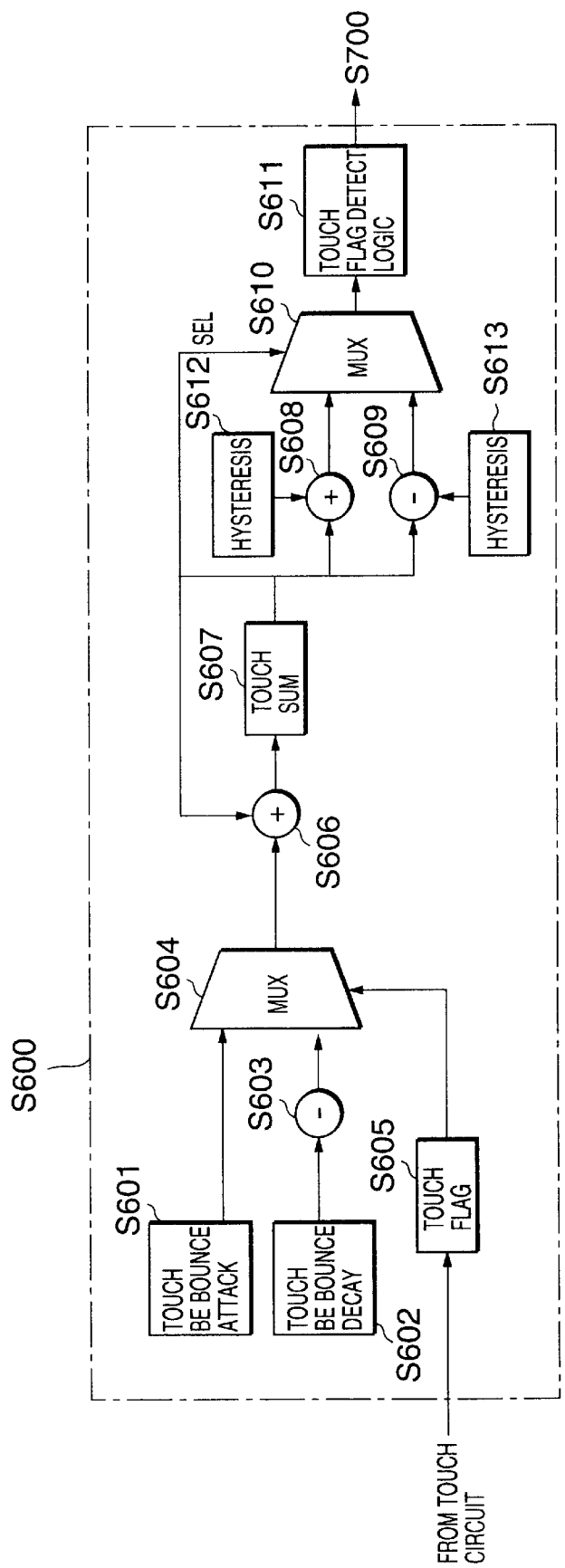
FIG. 16 is a block diagram showing a detail of a part of FIG. 12.

FIG. 16 is a block diagram of step s600 of FIG. 12 in detail. As shown in FIG. 16, first of all, a touch flag is provided (s605) on the basis of the data from the touch circuit. On the other hand, when the touch flag is provided, either the data from the touch debounce attack (s601) in the case where the contact pressure is strongly applied to the touch sensor which increases the contact pressure or the data decreased (s603) from the touch debounce decay (s602) in the case where the contact is separated from the touch sensor that decreases the contact pressure is outputted by the multiplexer.

The total sumof the touch data is sought from this data (s607), and this total sum data is added timely (s604). Thereafter, with respect to the total sum data, either the data for calculating the sum (s608) with the hysteresis (s612) or the data for calculating the difference (s609) from the hysteresis (s613) is selectively outputted by the multiplexer on the basis of the serial signal SEL from step s607 (s610). Thereafter, the touch flag detect logic is formed on this output (s611). This formed output is inputted into step s700.

2-8. PROCESS ON ADJUSTMENT OF THE MOTOR

Figure 17:
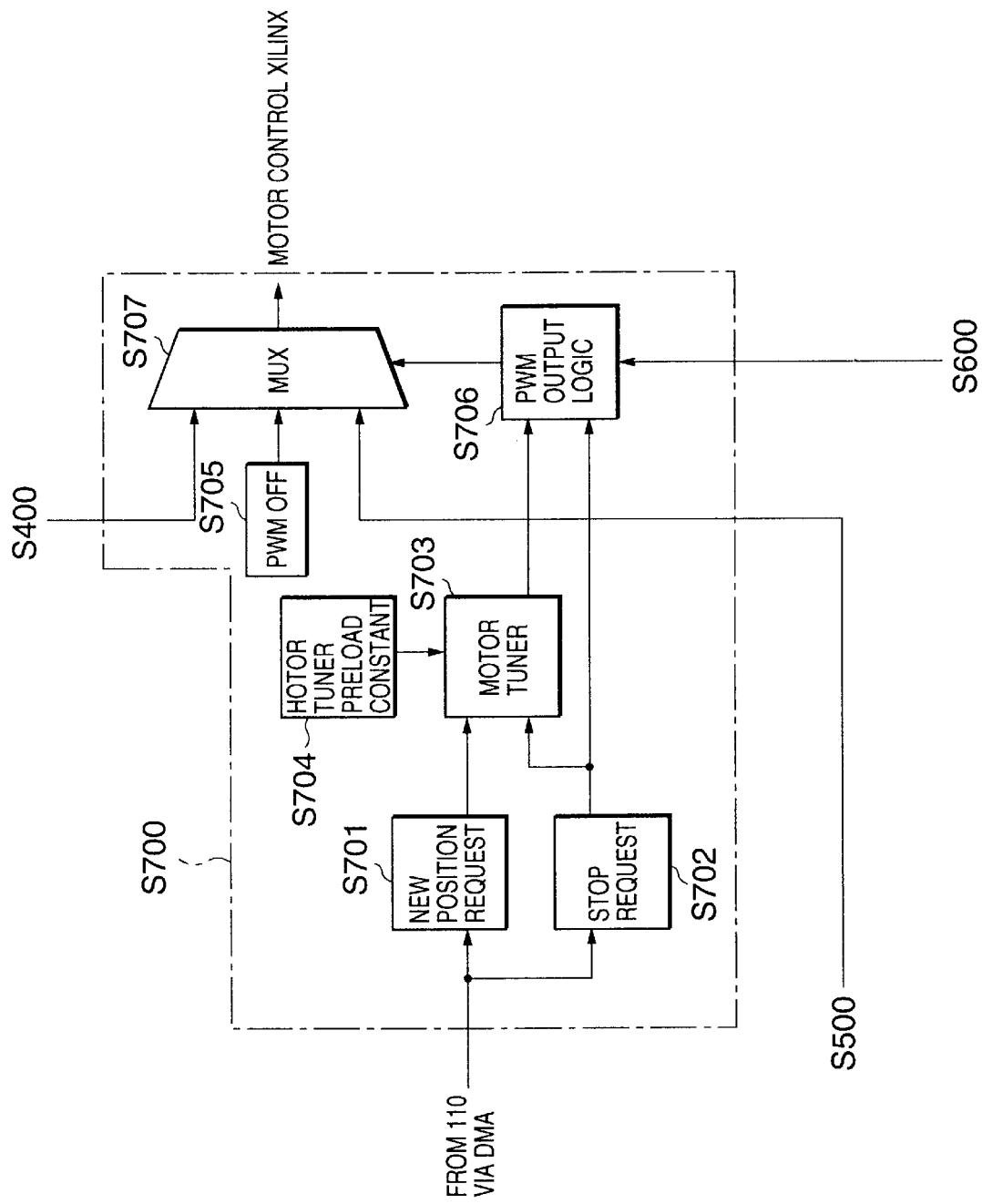
FIG. 17 is a block diagram showing a detail of a part of FIG. 12.

FIG. 17 is a block diagram showing step s700 of FIG. 12 in detail. As shown in FIG. 17, the data from the microprocessor 110 via the DMA is used to calculate the requested positional data on the current position (new position request) (s701) and also to calculate the requested stop position (s702). The requests from both steps s701 and s702 are inputted into a motor tuner (s703) to output the corresponding data on the basis of a motor tuner preload constant (s704).

On the other hand, the request from step s702 is also inputted into the PWM output logic (s706). The PWM output logic is formed on the basis of the output from step s703, the output from the stop request (s702) and the formed data from step s600 (s706). Any one of the data from step s500, the data from step s400 and the off demand of PWM (s705) is selectively outputted by the multiplexer on the basis of this formed logic (s707) to thereby output the output signal for controlling the motor.

According to the embodiment thus described, the operating knob is operated so that the current first set numerical value approaches the target second set numerical value. Then, when the difference between the first set numerical value and the second set numerical value falls within a certain allowable range, the drive portion is driven so that the operating knob automatically reaches the target second set numerical value. Thus, even without the operator's visual observation of the target second set numerical value, the operating portion may be caused to reach the position of the target second set numerical value.

Also, since the torque of the drive portion may be variably controlled, the drive control portion may change and control the value of the torque as desired and it is possible to slowly return the knob while taking a time or quickly return it for a short period of time in accordance with the operator's intention, thereby enhancing the operationability. In particular, it is possible to simulate the mechanical detent and the operator may reset the operation of the operating portion back to the original position only in accordance with the operator's finger feel without visually following the reset position. This enhances the operationability. Furthermore, it is possible to provide, for example, a feel like a mechanical detent at any desired position.

Also, the drive control portion may control the system so that at least one second set numerical value may be changed as desired. Thus, since the reset position is set freely, it is unnecessary for the operator to pay his attention to the setup.

Moreover, the touch sensor is provided for detecting whether or not the operator touches the operating knob. Then, when the touch sensor detect the contact condition, the drive control portion is controlled to drive the drive portion. Thus, since the drive portion is driven only under the contact condition, it is unnecessary to drive the drive portion in the noncontact condition (when the operator does not touch the operating portion), thereby aiming the reduction of the power consumption and the reduction of the wear of the drive portion.

Also, the drive control portion is controlled so as to increase the torque of the drive portion as the first set numerical value approaches at least one second set numerical value within the allowable range. Moreover, the drive control portion is controlled so as to decrease the torque of the drive portion when the first set numerical value is in the vicinity of at least one second set numerical value. Thus, it is possible to feel by the fingers the approach to the set value and the remote condition from the set value. This makes it possible to more clearly feel the operation.

SECOND EMBODIMENT

A second embodiment of an operating knob device according to the present invention will now be described. FIG. 18A is an explanatory diagram of an example in the case where two target positions, i.e., atarget position 204-1 anda target position 204-2, are set in a second position calculation portion 74 for calculating the target position. FIG. 18B is an explanatory diagram showing an example where the mechanical detent is simulated in the example of FIG. 18A.

In this embodiment, as shown in FIGS. 18A and 18B, a plurality of target positions and a plurality of detents are provided. 210-1 denotes a detent for the target position 204-1, and 210-2 denotes a detent for the target position 204-2. The detent 210-2 is larger in size than the detent 210-1.

Thus, it is possible to provide a plurality of target positions to be calculated (the number of the positions to be registered in advance) in the second position calculation portion 74 for calculating the target position. Also, the curve (torque) of the detent is changed so that the plurality of target positions may be distinguished from each other by the operator.

As described above, according to this embodiment, the drive control portion is controlled so as to have a plurality of second set numerical values in the variable range. Thus, without the operator's visual observation, it is possible for the operator to readily distinguish the position in the variable range and the plurality of second set numerical values (a plurality of reset positions) from each other and recognize them by the operation of the operating portion.

Incidentally, in this second embodiment, the other operation and structure are substantially the same as those of the first embodiment, and the common structure in the first embodiment may be applied to the second embodiment.

THIRD EMBODIMENT

An operating knob device in accordance with a third embodiment of the present invention will now be described. FIG. 18C shows the case where a number of target positions are arranged at an equal interval.

As shown in FIG. 18C, inthis embodiment, further, aplurality of target positions are arranged at an equal interval. Then, each detent is provided corresponding to each of the target positions. Thus, it is possible to simulate the mechanical switch.

Incidentally, in this third embodiment, the other structure is substantially the same as that of the first embodiment, and the structure that is common in the first embodiment may be included in this embodiment.

FOURTH EMBODIMENT

An operating knob device in accordance with a fourth embodiment of the present invention will now be described. FIG. 19A shows acase where three target positions 234-1, 234-2 and 234-3 are set in the second position calculation portion 74 for outputting the target position. FIG. 19B is an explanatory diagram showing the absolute value of the drive torque of the drive portion 50 in case of FIG. 19A. In this example, as shown in FIGS. 19A and 19B, the torque characteristics are changed in the plurality of target positions.

The target position 234-2 is a center position and is adapted to give a torque for simulating the mechanical detent as indicated by 240-2.

The torque is raised abruptly outside of both end target positions 234-1 and 234-3 as indicated by 240-1 and 240-3. In this case, the operator feels as if the mechanical detent is present at the target position 234-2 in the rotatable range of the operating knob 40 between the target position 234-1 and the target position 234-3. Namely, the mechanical stop is simulated in the target position 234-1 and the target position 234-3.

Here, the mechanical stop means the case where the operating knob 40 is unmovable both at an angle (or distance) of the target position 234-3 or more and an angle (or distance) of the target position 234-1 or less and the operating knob 40 stops.

According to this embodiment, without forming mechanical structure, there is provided a structure that may have the same function as that of the mechanical stop. For this reason, the target position is changed to thereby make it possible to change the stop position of the operating knob 40 as desired.

As described above, according to the embodiment of the invention, the drive control portion is controlled to simulate the mechanical stop. Thus, operator may readily clearly recognize the position at which the operating portion is to be stopped when the setup is reset only by the finger feel.

Also, the drive control portion is controlled so that the respective torque changes corresponding to the plurality of second set numerical values within the allowable range may be different from each other. Thus, the operator may distinguish the plurality of second set numerical values from each other only by the finger feel.

Also, in the case where the change to at least one of the second set numerical values out of the plurality of second set numerical values is effected, the drive control portion is controlled so as to simulate the mechanical detent. Also, the drive control portion is controlled to simulate the mechanical stop in the case of changing into another second set numerical value. Thus, only by the finger sense, the operator may recognize the plurality of positions to be reset in the operation of the operating knob in response to, for example, importance of the positions, thereby further enhancing the operationability.

Incidentally, in the fourth embodiment, the other structure is substantially the same as that of the first embodiment, and the features that are used in common in the first embodiment are included in this embodiment.

FIFTH EMBODIMENT

Figure 20:
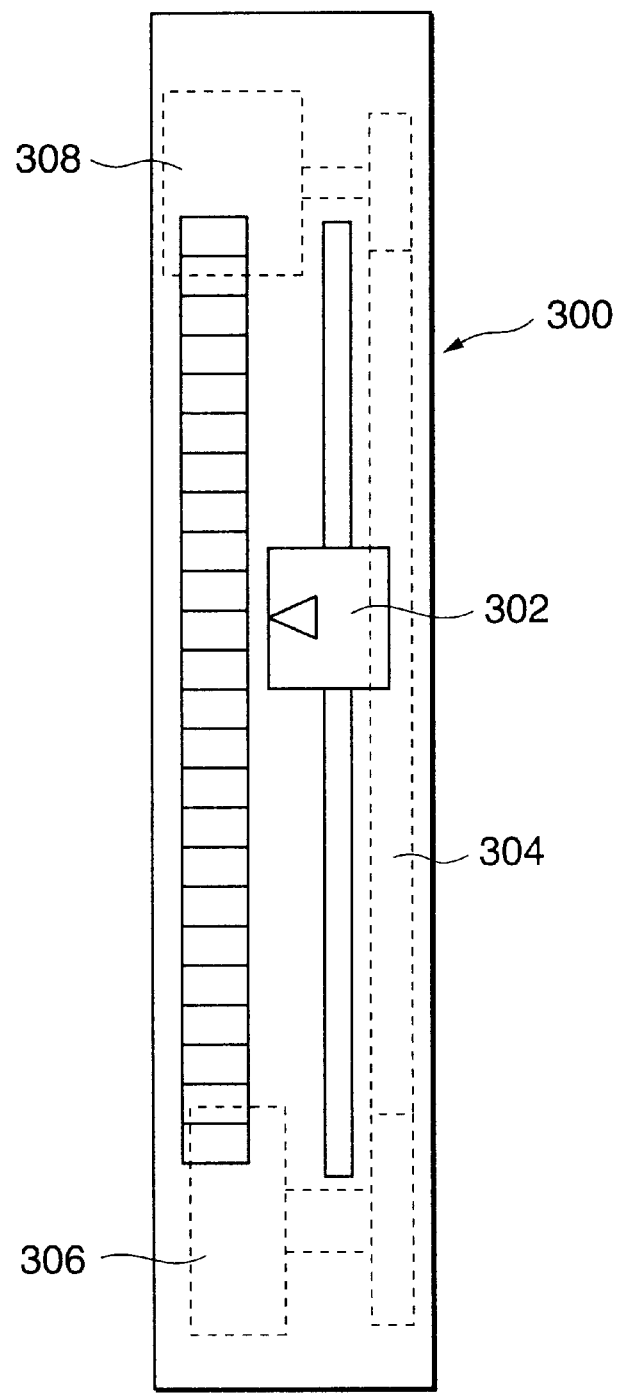
FIG. 20 is an explanatory diagram of an operating knob device in accordance with a fourth embodiment of the invention.

An operating knob device according to a fifth embodiment of the present invention will now be described. FIG. 20 is an explanatory diagram showing an example of another structure of the operating knob device 1 shown in FIG. 1.

In this embodiment, as shown in FIG. 20, there is provided an operating portion that moves linearly.

In the operating knob device 1 shown in FIG. 1, the operating knob 40, the position output portion 14 and the drive portion 50 are coupled mechanically with each other through the shaft 60.

On the other hand, in the operating knob device 300 shown in FIG. 20, the operating knob 302, the position output portion 306 and the drive portion 308 are coupled mechanically with each other by a belt 304 that is a power conversion mechanism. With such a mechanism, the operating knob 302 takes not the rotational motion but a linear motion.

As described above, according to the embodiment, even if the drive portion is moved in a linear manner, it is possible to provide the operating knob that may realize the above-described detent or the like. Incidentally, in this fifth embodiment, in the same manner as in the first embodiment, the common structure may be applied to this embodiment.

SIXTH EMBODIMENT

A sixth embodiment of the present invention will now be described. In this embodiment, an example is shown in which the above described operating knob device is used in electronic equipment. A mixing console that is acoustic equipment may be given as one example of this electronic equipment.

Figure 21:
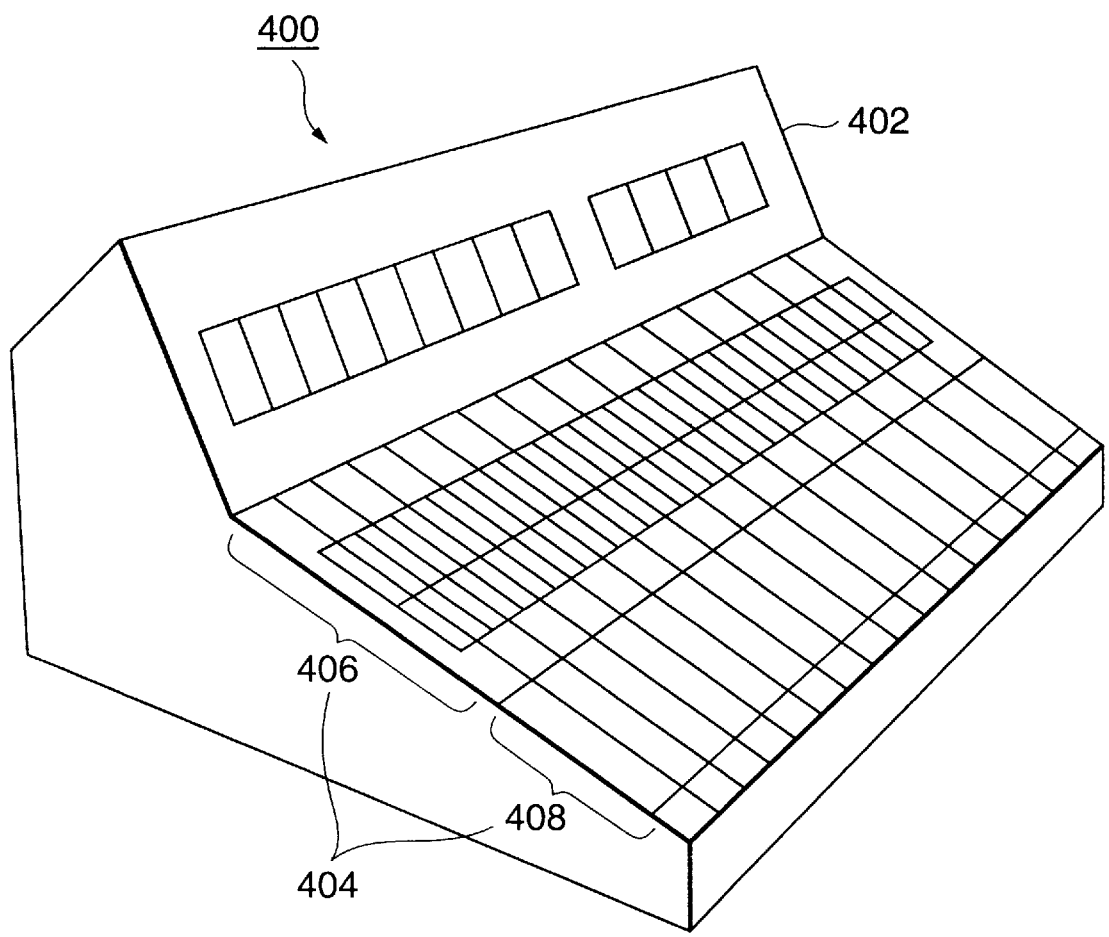
FIG. 21 is a perspective view showing an example of electronic equipment using the operating knob device of the present invention.

FIG. 21 is a perspective view showing an example of a mixing console to which the present invention is applied used in a recording studio and the like.

As shown in FIG. 21, a typical mixing console 400 is composed of two parts.

Numeral 402 denotes a meter bridge and numeral 404 denotes an operation panel. A level meter or the like representative of the level of the signal is received in the meter bridge 402.

An extremely large number of operating knob devices are provided in the operation panel 404, and the number of the minimum size mixing console is one hundred or more. In case of a medium size console, the number of the operating knob devices exceeds six hundreds or more. The operation panel 404 is divided further into two parts due to the operational requirement. The operating knob device 1 having the rotary operating knob 40 shown in FIG. 1 is provided in a half-upper part indicated by numeral 406.

On the other hand, as shown in FIG. 20, the operating knob device 300 having operating knob 302 taking a linear motion is provided in a lower-half 408.

FIG. 22 is a block diagram showing an overall structure of the mixing console 400. As shown in FIG. 22, the mixing console 400 includes a meter bridge 402, an operation panel 404 and a general control portion 410 for totally controlling these components. Then, a plurality of level meters 403-1 to 403-n are provided in the meter bridge 402.

The upper operating group 406 and the lower operating group 408 are provided in the operation panel 404. A plurality of rotary operating knob devices 407-1 to 407-n are provided in the upper operating group 406. A plurality of linear type operating knob devices 409-1 to 409-n are provided in the lower operating group 408.

Then, the general control portion 410 may selectively and totally control these respective rotary operating knob devices 407-1 to 407-n, respective linear operating knob devices 409-1 to 409-n and respective level meters 403-1 to 403-n while making it possible to control independently these components.

As described above, in accordance with the embodiment, irrespective of the fact that an extremely large number of operating knob devices are installed, the operator may readily perform the work of the reset. Namely, it is unnecessary to visually observe the respective reset work with the plurality of operating knob devices and it is possible to operate the knob only by the finger sense. Accordingly, it is possible to perform the reset work quickly, for example, by using two hands of the operator, for example, or by using a plurality of fingers in combination to operate the plurality of operating knobs or the like.

Incidentally, in the operating knob devices 407-1 to 407-n and 409-1 to 409-n, the function block structure, the control diagram and the like are substantially the same as those of the structure of the first embodiment.

Incidentally, it is apparent that it is possible for those skilled in the art to make various modifications and changes to the embodiments described in the specification of the present invention without departing from the spirit and scope of the present invention. For example, in the structure shown in FIG. 1 in accordance with the first embodiment, the single position output portion is formed as the position detection portion and the current position and the reset position (target position) are held in response to the contact period with the operator. In the control portion, the respective positions are calculated in the first position calculation portion and the second position calculation portion.

At this time, it is possible to also use the second position calculation portion to calculate the plurality of reset positions (target positions) and provide the plurality of second position calculation portions per se. Also, it is possible to provide a plurality of comparator portions of the drive control portion corresponding to the second position calculation portions.

Furthermore, it is possible to provide a plurality of position output portions and to provide the current position output portion for outputting the current position and the target position output portion for outputting the target position. In this case, the information from the current position output portion is inputted into the first position calculation portion, whereas the information from the target position output portion is inputted into the second position calculation portion.

Also, it is possible to provide a plurality of current position output portions and to seek the average of each output data in the first position calculation portion. Alternatively, it is possible to form a plurality of touch sensors or the like.

Furthermore, it is possible to provide a plurality of motors for constituting the drive portion and to control at least one motor in the forward rotation and the other motor in the reverse rotation. It is thus possible to perform a more accurate control.

Also, it is unnecessary to form the operating knob that is the operating portion into a cylindrical shape but it is possible to select any desired shape, for example, a quadrangle shape, a pentagonal shape, a hexagonal shape, an octagonal shape, a conical shape or the like.

Furthermore, the scale is from zero to 270 degrees but may be formed from zero to 360 degrees. Moreover, two kinds of indices, i.e., a large scale of zero to 360 degrees and a small scale (indices obtained by dividing one degree into one sixtieth or the like) may be used for a more precise control.

Also, the respective embodiments have been described assuming that the mechanical detent or mechanical stop is simulated, and the case for controlling the torque of the drive portion has been described. However, the present invention is not limited to the torque control. In brief, it is sufficient to simulate the mechanical detent or mechanical stop and also to control a drive parameter of the drive portion such as a current, a voltage or a velocity.

Furthermore, in the sixth embodiment, it is possible to also use a single DSP and a single microprocessor for each DSP and each microprocessor within each operating knob device. In this case, it is sufficient to form the algorisms for processing these and the algorism for controlling the overall system in the memory such as the single DSP or the like in advance.

Incidentally, in the respective modifications, in order to perform the control corresponding to the respective modifications, it goes without saying that various control algorisms such as DSP or the like should be changed and added if necessary.

Also, the electronic equipment is not limited to the mixing console but may be applied to various acoustic equipment that needs the operating knob devices, such as a radio, a stereo or the like.

Furthermore, it goes without saying that various examples obtained by combination of the foregoing embodiments and modifications may fall within the scope of the invention.

The position detection portion 10 shown in FIG. 1 may be substituted by, e.g., a rotary encoder 501 using an optical disk and the like and shown in FIG. 23. The rotary encoder 501 is coaxial with the shaft 60 and is composed of a disk 502, photo sensors 503, 504, and a detector circuit 505. The disk 502 has a large number of slots 506 formed concentrically thereon. The photo sensors 503, 504 detect the slots 506. The detector circuit 505 detects the phase of each of the photo sensors 503, 504. The detector circuit 505 has two outputs 507, 508. From the output 507, a signal telling that the photo sensors 503, 504 have detected the slots passing by is output. From the output 508, the phase of each of the photo sensors 503, 504 is output. The outputs 507, 508 indicate the rotation angle and the rotation direction of the disk 502 with respect to the photo sensors 503, 504.

The use of the rotary encoder as such in place of the position detection portion 10 eliminates the need for the LPF 138, the analog multiplexer 136, the LPF 134, and the A/D conversion circuit 132 that are shown in FIG. 2. The DSP 100 may be structured such that it directly processes the output of the rotary encoder 501.

What is claimed is:

1. An operating knob device comprising:
    a position detection portion for detecting a position of a set numerical value of an object to be set;
    an operating portion for changing and operating the set numerical value;
    a drive portion for driving said operating portion; and
    a control portion for controlling said drive portion on the basis of a detection result of said position detection portion;
    wherein said control portion includes:
        a first position calculation portion for calculating a first set numerical value that is a current set numerical value of the object to be set, on the basis of the detection result of said position detection portion;
        a second position calculation portion for calculating one or a plurality of second set numerical values that are set numerical values before change of the object to be set, on the basis of the detection result of said position detection portion; and
        a drive control portion for controlling said drive portion to be driven and changing and controlling a drive parameter of said drive portion when an absolute value of a difference between the first set numerical value and at least one of said second set numerical values falls within an allowable range.

2. The operating knob device according to claim 1, wherein said drive control portion changes and controls a torque of said drive portion.

3. The operating knob device according to claim 1, wherein said drive control portion is controlled to simulate a mechanical detent.

4. The operating knob device according to claim 1, wherein said drive control portion is controlled to simulate a mechanical stop.

5. The operating knob device according to claim 1, wherein said drive control portion is controlled to simulate a mechanical detent in the case where at least one of said second set numerical values is selected out of said plurality of second set numerical values, and to simulate a mechanical stop in the case where the other second set numerical value is selected.

6. The operating knob device according to claim 1, wherein said drive control portion is controlled to change at least one of said second set numerical values into any desired value.

7. The operating knob device according to claim 1, wherein said drive control portion is controlled so that said plurality of second set numerical values are present in a variable range.

8. An operating knob device according to claim 1, wherein said position detection portion comprises a rotary encoder.

9. The operating knob device according to claim 1, further comprising a detection portion for detecting whether or not an operator contacts with said operating portion,
    wherein said drive control portion is controlled to drive said drive portion when said detection portion detects the contact condition.

10. The operating knob device according to claim 2, wherein said drive control portion is controlled so that a torque of said drive portion is increased as said first set numerical value approaches at least one of said second set numerical values within the allowable range and the torque of said drive portion is decreased when the first set numerical value is in the vicinity of at least one said second set numerical value.

11. The operating knob device according to claim 2, wherein said drive control portion is controlled so that respective torque changes in response to said plurality of second set numerical values become changes which are different from each other within the allowable range.

12. Electronic equipment having one or a plurality of operating knob devices each according to claim 1.

13. An operating knob device comprising:
    a position detection portion for detecting a position of a set numerical value of an object to be set;
    a rotary operating portion for changing and operating the set numerical value;
    a drive portion for rotatively driving said rotary operating portion; and
    a control portion for controlling said drive portion on the basis of a detection result of said position detection portion;
    wherein said control portion includes:
        a first position calculation portion for calculating a first set numerical value that is a current set numerical value of the object to be set, on the basis of the detection result of said position detection portion;
        a second position calculation portion for calculating one or a plurality of second set numerical values that are set numerical values before change of the object to be set, on the basis of the detection result of said position detection portion; and
        a drive control portion for controlling said drive portion to be rotatingly driven and changing and controlling a drive parameter of said drive portion when an absolute value of a difference between the first set numerical value and at least one said second set numerical value falls within an allowable range.

14. The operating knob device according to claim 13, wherein said drive control portion changes and controls a torque of said drive portion.

15. The operating knob device according to claim 13, wherein said drive control portion is controlled to simulate a mechanical detent.

16. The operating knob device according to claim 13, wherein said drive control portion is controlled to simulate a mechanical stop.

17. The operating knob device according to claim 13, wherein said drive control portion is controlled to simulate a mechanical detent in the case where at least one of said second set numerical values is selected out of said plurality of second set numerical values, and to simulate a mechanical stop in the case where the other second set numerical value is selected.

18. The operating knob device according to claim 13, wherein said drive control portion is controlled to change at least one of said second set numerical values into any desired value.

19. The operating knob device according to claim 13, wherein said drive control portion is controlled so that said plurality of second set numerical values are present in a variable range.

20. The operating knob device according to claim 13, further comprising a detection portion for detecting whether or not an operator contacts with said operating portion, wherein said drive control portion is controlled to drive said drive portion when said detection portion detects the contact condition.

21. The operating knob device according to claim 14, wherein said drive control portion is controlled so that a torque of said drive portion is increased as said first set numerical value approaches at least one of said second set numerical values within the allowable range and the torque of said drive portion is decreased when the first set numerical value is in the vicinity of at least one of said second set numerical values.

22. The operating knob device according to claim 14, wherein said drive control portion is controlled so that respective torque changes in response to said plurality of second set numerical values become changes which are different from each other within the allowable range.

23. Electronic equipment having one or a plurality of operating knob devices each according to claim 13.

24. An operating knob device comprising:

a position detection portion for detecting a position of a set numerical value of an object to be set;

a linear operating portion for changing and operating the set numerical value;

a drive portion having a rotary portion for rotatingly driving and a power translating portion for converting the rotational motion of said rotary portion into a linear motion for moving said operating portion; and a control portion for controlling said drive portion on the basis of a detection result of said position detection portion;

wherein said control portion includes:

a first position calculation portion for calculating a first set numerical value that is a current set numerical value of the object to be set, on the basis of the detection result of said position detection portion;

a second position calculation portion for calculating one or a plurality of second set numerical values that are set numerical values before change of the object to be set, on the basis of the detection result of said position detection portion; and a drive control portion for controlling said drive portion to be driven and changing and controlling a drive parameter of said drive portion when an absolute value of a difference between the first set numerical value and at least one of said second set numerical values falls within an allowable range.

25. The operating knob device according to claim 24, wherein said drive control portion changes and controls a torque of said drive portion.

26. The operating knob device according to claim 24, wherein said drive control portion is controlled to simulate a mechanical detent.

27. The operating knob device according to claim 24, wherein said drive control portion is controlled to simulate a mechanical stop.

28. The operating knob device according to claim 24, wherein said drive control portion is controlled to simulate a mechanical detent in the case where at least one of said second set numerical values is selected out of said plurality of second set numerical values, and to simulate a mechanical stop in the case where the other second set numerical value is selected.

29. The operating knob device according to claim 24, wherein said drive control portion is controlled to change at least one of said second set numerical values into any desired value.

30. The operating knob device according to claim 24, wherein said drive control portion is controlled so that said plurality of second set numerical values are present in a variable range.

31. The operating knob device according to claim 24, further comprising a detection portion for detecting whether or not an operator contacts with said operating portion, wherein said drive control portion is controlled to drive said drive portion when said detection portion detects the contact condition.

32. The operating knob device according to claim 25, wherein said drive control portion is controlled so that a torque of said drive portion is increased as said first set numerical value approaches at least one of said second set numerical values within the allowable range and the torque of said drive portion is decreased when the first set numerical value is in the vicinity of at least one of said second set numerical values.

33. The operating knob device according to claim 25, wherein said drive control portion is controlled so that respective torque changes in response to said plurality of second set numerical values become changes which are different from each other within the allowable range.

34. Electronic equipment having one or a plurality of operating knob devices each according to claim 24.

* * * * *

UNITED STATES PATENT AND TRADEMARK OFFICE
CERTIFICATE OF CORRECTION

PATENT NO. : 6,356,045 B1
DATED : March 12, 2002
INVENTOR(S) : Newton et al.

It is certified that error appears in the above-identified patent and that said Letters Patent is hereby corrected as shown below:

<u>Drawings,</u>
Figure 14, step S412, "COMTANT" should read -- CONSTANT --;
Figure 14, step S413, "IDIFFERCNTIAL" should read -- DIFFERENTIAL --; and
Figure 14, step S418, "INTEGRAT" should read -- INTEGRATION --
Figure 15, step S518, "DERECT" should read -- DETECT --
Figure 16, steps S601 and S602, "BE BOUNCE" (both occurrences) should read
-- DE-BOUNCE --
Figure 17, step S704, "HOTOR" should read -- MOTOR --

<u>Column 1,</u>
Lines 39-40, "when the variable resistor is returned back to the original position," should be deleted
Line 51, "¶It" should read -- It -- (i.e., append to previous line); and "taking a time" should be deleted
Line 52, "for a short period of time" should be deleted
Line 64, "may prevent" should read -- makes necessary --

<u>Column 2,</u>
Line 37, "while taking a time" should be deleted; and "for" should be deleted
Line 38, "a short period of time" should be deleted
Lines 39, 45 and 65, "operationability" should read -- operability --

<u>Column 3,</u>
Line 19, "noncontact" should read -- non-contact --

<u>Column 5,</u>
Line 7, "algorism" should read -- algorithm --
Line 41, "detechion" should read -- detection --
Line 45, "¶FIRST" should read -- FIRST --
Line 63, "pon-" should read -- po- --

<u>Column 7,</u>
Line 38, "an" should be deleted

<u>Column 8,</u>
Line 17, "(outenable)" should read -- (out-enable) --
Line 41, "outputs" should read -- it outputs --; and "outenable" should read
-- out-enable --

UNITED STATES PATENT AND TRADEMARK OFFICE
CERTIFICATE OF CORRECTION

PATENT NO.     : 6,356,045 B1
DATED           : March 12, 2002
INVENTOR(S)  : Newton et al.

It is certified that error appears in the above-identified patent and that said Letters Patent is hereby corrected as shown below:

Column 9,
Line 7, "360" should read -- 360 -- (delete boldface)

Column 10,
Line 12, "illustrate" should read -- illustrates --

Column 11,
Line 13, "ALGORISM" should read -- ALGORITHM --
Lines 14, and 36, "algorisms" should read -- algorithms --
Line 37, "algorism" (both occurrences) should read -- algorithm --
Lines 38, 40, 42, 48 and 65, "algorism" should read -- algorithm --

Column 13,
Line 5, "algorism" should read -- algorithm --
Line 30, "algorism" should read -- algorithm --
Line 32, "filter on the" should read -- filter is performed on the --

Column 14,
Line 6, "LPF138" should read -- LPF 138 --

Column 15,
Line 12, "otherhand" should read -- other hand --; "sumof" should read -- sum of --; and "datafromthe" should read -- data from the --
Line 47, "sumof" should read -- sum of --

Column 16,
Lines 23 and 28, "operationability" should read -- operability --
Line 37, "detect" should read -- detects --
Line 60, "atarget" should read -- a target --
Line 61, "anda" should read -- and a --

Column 17,
Line 30, "inthis" should read -- in this --; and "aplu-" should read -- a plu- --
Line 43, "acase" should read -- a case --

Column 18,
Line 27, "operationability" should read -- operability --

UNITED STATES PATENT AND TRADEMARK OFFICE
CERTIFICATE OF CORRECTION

PATENT NO.   : 6,356,045 B1
DATED        : March 12, 2002
INVENTOR(S)  : Newton et al.

It is certified that error appears in the above-identified patent and that said Letters Patent is hereby corrected as shown below:

Column 20,
Lines 48, 49 and 55, "algorisms" should read -- algorithms --

Signed and Sealed this

Fifteenth Day of April, 2003

JAMES E. ROGAN
*Director of the United States Patent and Trademark Office*